(12) United States Patent
Kure et al.

(10) Patent No.: US 12,221,189 B2
(45) Date of Patent: Feb. 11, 2025

(54) CONTROL DEVICE FOR HUMAN-POWERED VEHICLE

(71) Applicant: Shimano Inc., Osaka (JP)

(72) Inventors: Nobuhiro Kure, Osaka (JP); Toru Sano, Osaka (JP); Hiroko Matsubayashi, Osaka (JP)

(73) Assignee: Shimano Inc., Osaka (JP)

( * ) Notice: Subject to any disclaimer, the term of this patent is extended or adjusted under 35 U.S.C. 154(b) by 589 days.

(21) Appl. No.: 17/500,218

(22) Filed: Oct. 13, 2021

(65) Prior Publication Data
US 2023/0113891 A1   Apr. 13, 2023

(51) Int. Cl.
| | |
|---|---|
| H02K 11/04 | (2016.01) |
| B60B 27/00 | (2006.01) |
| B62J 43/30 | (2020.01) |
| B62J 45/20 | (2020.01) |
| B62M 6/50 | (2010.01) |
| B62M 6/60 | (2010.01) |
| H02K 7/18 | (2006.01) |
| H02K 11/00 | (2016.01) |
| H02K 11/30 | (2016.01) |
| B62J 45/412 | (2020.01) |

(52) U.S. Cl.
CPC ............ *B62M 6/50* (2013.01); *B60B 27/0015* (2013.01); *B62J 43/30* (2020.02); *B62J 45/20* (2020.02); *B62M 6/60* (2013.01); *H02K 7/1846* (2013.01); *H02K 11/0094* (2013.01); *H02K 11/04* (2013.01); *H02K 11/30* (2016.01); *B62J 45/412* (2020.02)

(58) Field of Classification Search
CPC ........ B62K 23/00; H02K 7/006; H02K 7/083; H02K 7/14; H02K 11/33; H02K 7/1861; H02K 21/22; B60B 27/0047; B60B 27/023; B60B 27/0005; B60B 27/04; B62J 45/00; B62J 6/12
See application file for complete search history.

(56) References Cited

U.S. PATENT DOCUMENTS

| | | | |
|---|---|---|---|
| 6,806,685 B2 | 10/2004 | Suzuki et al. | |
| 7,042,123 B2* | 5/2006 | Kitamura | H02K 7/1846 |
| | | | 280/260 |
| 8,884,481 B2* | 11/2014 | Hasegawa | B62J 6/12 |
| | | | 310/263 |
| 10,205,328 B2 | 2/2019 | Suzuki et al. | |
| 2006/0226879 A1* | 10/2006 | Kitamura | B62J 6/015 |
| | | | 327/94 |
| 2018/0229803 A1 | 8/2018 | Wesling | |

(Continued)

*Primary Examiner* — Leda T Pham
(74) *Attorney, Agent, or Firm* — Global IP Counselors, LLP

(57) ABSTRACT

A control device is provided for a human-powered vehicle that includes a generator configured to output electrical power, an electric power storage device electrically connected to the generator, and a component having an actuator actuated by electrical power from at least one of the generator and the electric power storage device. The control device includes a controller electrically connected to at least one of the generator and the electric power storage device. The controller is configured to control an operation state of the component in accordance with information relating to at least one of an output state of the generator and a store state of the electric power storage device.

19 Claims, 9 Drawing Sheets

(56) References Cited

U.S. PATENT DOCUMENTS

2019/0009849 A1    1/2019   Komatsu et al.
2019/0351965 A1*   11/2019  Syouge .................. H01R 9/11
2020/0407012 A1    12/2020  Kitano et al.

* cited by examiner

CONTROL DEVICE FOR HUMAN-POWERED VEHICLE

BACKGROUND

Technical Field

This disclosure generally relates to a control device for a human-powered vehicle.

Background Information

In recent years, some human-powered vehicles (e.g., bicycle) are provided with electrical components or devices to make it easier for the rider to operate the human-powered vehicle. For example, some human-powered vehicles are provided with an electrically operated drivetrain for smoother shifting. Some of these electrically operated drivetrain use a rear multi-stage sprocket assembly with a motorized rear derailleur and a front multi-stage sprocket assembly with a motorized front derailleur. These motorized derailleurs are electrically operated by a control device (e.g., cycle computer) for operating a motor to perform a shifting operation. In some cases, electric power for these electrically operated drive train is supplied from an electric power generating device provided to a hub that rotatably supports a wheel of the human-powered vehicle. The electric power generating device generates electric power in accordance with the driving of the human-powered vehicle.

SUMMARY

Generally, the present disclosure is directed to various features of a control device for a human-powered vehicle. The term "human-powered vehicle" as used herein refers to a vehicle that can be driven by at least human driving force, but does not include a vehicle using only a driving power other than human power. In particular, a vehicle solely using an internal combustion engine as a driving power is not included in the human-powered vehicle. The human-powered vehicle is generally assumed to be a compact, light vehicle that sometimes does not require a license for driving on a public road. The number of wheels on the human-powered vehicle is not limited. The human-powered vehicle includes, for example, a monocycle and a vehicle having three or more wheels. The human-powered vehicle includes, for example, various types of bicycles such as a mountain bike, a road bike, a city bike, a cargo bike, and a recumbent bike, and an electric assist bicycle (E-bike).

In view of the state of the known technology and in accordance with a first aspect of the present disclosure, a control device is provided for a human-powered vehicle that includes a generator configured to output electrical power, an electric power storage device electrically connected to the generator, and a component having an actuator actuated by electrical power from at least one of the generator and the electric power storage device.

The control device comprises a controller electrically connected to at least one of the generator and the electric power storage device. The controller is configured to control an operation state of the component in accordance with information relating to at least one of an output state of the generator and a store state of the electric power storage device.

With the control device according to the first aspect, it is possible to control the component in a suitable operation state according to the output state of the generator and/or the store state of the electric power storage device.

In accordance with a second aspect of the present disclosure, the control device according to the first aspect is configured so that the operation state includes a normal operation state and an electric power-saving operation state, and the controller is configured to control the operation state from the normal operation state to the electric power-saving operation state in accordance with the information.

With the control device according to the second aspect, it is possible to control the component in the electric power-saving operation state according to the output state of the generator and/or the store state of the electric power storage device.

In accordance with a third aspect of the present disclosure, the control device according to the second aspect is configured so that the output state includes a first output state in that a speed value relating to a forward speed of the human-powered vehicle becomes equal to or smaller than a first predetermined speed value, and the controller is configured to control the operation state from the normal operation state to the electric power-saving operation state in accordance with the information relating to the first output state.

With the control device according to the third aspect, it is possible to control the component in the electric power-saving operation state to save electric power consumption when the human-powered vehicle is slower than a predetermined speed.

In accordance with a fourth aspect of the present disclosure, the control device according to the third aspect is configured so that the output state includes a second output state in that the speed value becomes equal to or smaller than a second predetermined speed value, the second predetermined speed value is smaller than the first predetermined speed value, the operation state further includes a first power-off operation state, and the controller is configured to control the operation state from the electric power-saving operation state to the first power-off operation state in accordance with the information relating to a second output state.

With the control device according to the fourth aspect, it is possible to further save electric power consumption when the human-powered vehicle is slower than a predetermined speed.

In accordance with a fifth aspect of the present disclosure, the control device according to the third aspect is configured so that the output state includes a third output state in that the speed value becomes larger than a third predetermined speed value, and the controller is configured to control the operation state from the electric power-saving operation state to the normal operation state in accordance with the information relating to the third output state.

With the control device according to the fifth aspect, it is possible to return to the normal operation state when the human-powered vehicle is faster than a predetermined speed.

In accordance with a sixth aspect of the present disclosure, the control device according to any one the second aspect to the fifth aspect is configured so that the store state includes a first store state in that an electric power value of the electric power storage device becomes equal to or smaller than a first predetermined electric power value, and the controller is configured to control the operation state from the normal operation state to the electric power-saving operation state in accordance with the information relating to the first store state.

With the control device according to the sixth aspect, it is possible to control the component in the electric power-saving operation state to save electric power consumption when the electric power value of the electric power storage device is smaller than a predetermined electric power value.

In accordance with a seventh aspect of the present disclosure, the control device according to the sixth aspect is configured so that the store state includes a second store state in that the electric power value become equal to or smaller than a second predetermined electric power value, the second predetermined electric power value is smaller than the first predetermined electric power value, the operation state further includes a second power-off operation state, and the controller is configured to control the operation state from the normal operation state to the second power-off operation state in accordance with the information relating to a second store state.

With the control device according to the seventh aspect, it is possible to further save electric power consumption when the electric power value of the electric power storage device is smaller than a predetermined electric power value.

In accordance with an eighth aspect of the present disclosure, the control device according to the sixth aspect or the seventh aspect is configured so that the store state includes a third store state in that the electric power value of the electric power storage device becomes equal to or larger than the first predetermined electric power value, and the controller is configured to control the operation state from the electric power-saving operation state to the normal operation state in accordance with the information relating to the third store state.

With the control device according to the eighth aspect, it is possible to return to the normal operation state when the electric power value of the electric power storage device is larger than a predetermined electric power value.

In accordance with a ninth aspect of the present disclosure, the control device according to any one of the second aspect to the eighth aspect is configured so that the controller is configured to limit functionality of the component in the electric power-saving operation state.

With the control device according to the ninth aspect, it is possible to save electric power consumption of the component. Furthermore, it is also possible to reduce misoperation or prevent inoperable state when the electric power is not enough.

In accordance with a tenth aspect of the present disclosure, the control device according to the ninth aspect is configured so that the controller is configured to decrease an operating rate of the component in the electric power-saving operation state, and the operating rate includes at least one of generating force rate to assist pedaling.

With the control device according to the tenth aspect, it is possible to save electric power consumption of the component by decreasing an operating rate of the component. Furthermore, it is also possible to reduce misoperation or prevent inoperable state when the electric power is not enough.

In accordance with an eleventh aspect of the present disclosure, an electrical device comprises the control device according to any one of the first aspect to the tenth aspect, and the component having the actuator activated in response to operation of an operating member.

With the electrical device according to the eleventh aspect, it is possible to control the component in a suitable operation state according to the output state of the generator and/or the store state of the electric power storage device.

In accordance with a twelfth aspect of the present disclosure, the electrical device according to the eleventh aspect further comprises a rectifier electrically connected between the generator and the electric power storage device, where the rectifier is configured to rectify the electrical power outputted from the generator.

With the electrical device according to the twelfth aspect, it is possible to rectify the electrical power outputted from the generator to convert alternating current from the generator to direct current.

In accordance with a thirteenth aspect of the present disclosure, the electrical device according to the twelfth aspect is configured so that the electric power storage device includes a plurality of electric power storage elements connected in series relative to each other, where the plurality of electric power storage elements is configured to store the electrical power outputted from the generator in a time-division manner.

With the electrical device according to the thirteenth aspect, it is possible to charge the plurality of electric power storage elements to a voltage level of the generator, respectively.

In accordance with a fourteenth aspect of the present disclosure, the electrical device according to the thirteenth aspect is configured so that the rectifier and the electric power storage elements configured to form a voltage multiplier circuit.

With the electrical device according to the fourteenth aspect, it is possible to charge the electric power storage device to a higher voltage level than the generator.

In accordance with a fifteenth aspect of the present disclosure, the electrical device according to any one of the eleventh aspect to the fourteenth aspect further comprises a hub axle, and a hub body rotatably provided with respect to the hub axle, where the generator is disposed between the hub axle and the hub body.

With the electrical device according to the fifteenth aspect, it is possible to generate the electrical power by the rotation of the hub body.

In accordance with a sixteenth aspect of the present disclosure, the electrical device according to the fifteenth aspect is configured so that the electric power storage device is provided to the hub axle.

With the electrical device according to the sixteenth aspect, it is possible to provide the electric power storage device and the hub axle as a unit.

In accordance with a seventeenth aspect of the present disclosure, the electrical device according to the fifteenth aspect or the sixteenth aspect is configured so that the electric power storage device is accommodated inside the hub body.

With the electrical device according to the seventeenth aspect, it is possible to house the electric power storage device in the hub body.

In accordance with an eighteenth aspect of the present disclosure, the electrical device according to any one the fifteenth aspect to the seventeenth aspect is configured so that the controller is provided to the hub body.

With the electrical device according to the eighteenth aspect, it is possible to provide the controller and the hub body as a unit.

In accordance with a nineteenth aspect of the present disclosure, a system is provided for a human-powered vehicle, in which the system comprises the electrical device according to any one of the eleventh aspect to the eighteenth aspect.

With the system according to the nineteenth aspect, it is possible to control the component in a suitable operation state according to the output state of the generator and/or the store state of the electric power storage device.

Also, other objects, features, aspects and advantages of the disclosed control device will become apparent to those skilled in the art from the following detailed description, which, taken in conjunction with the annexed drawings, discloses preferred embodiments of the control device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the human-powered vehicle field (e.g., the bicycle field) from this disclosure that the following descriptions of the embodiments are provided for illustration only and not for the purpose of limiting the invention as defined by the appended claims and their equivalents.

Figure 1:
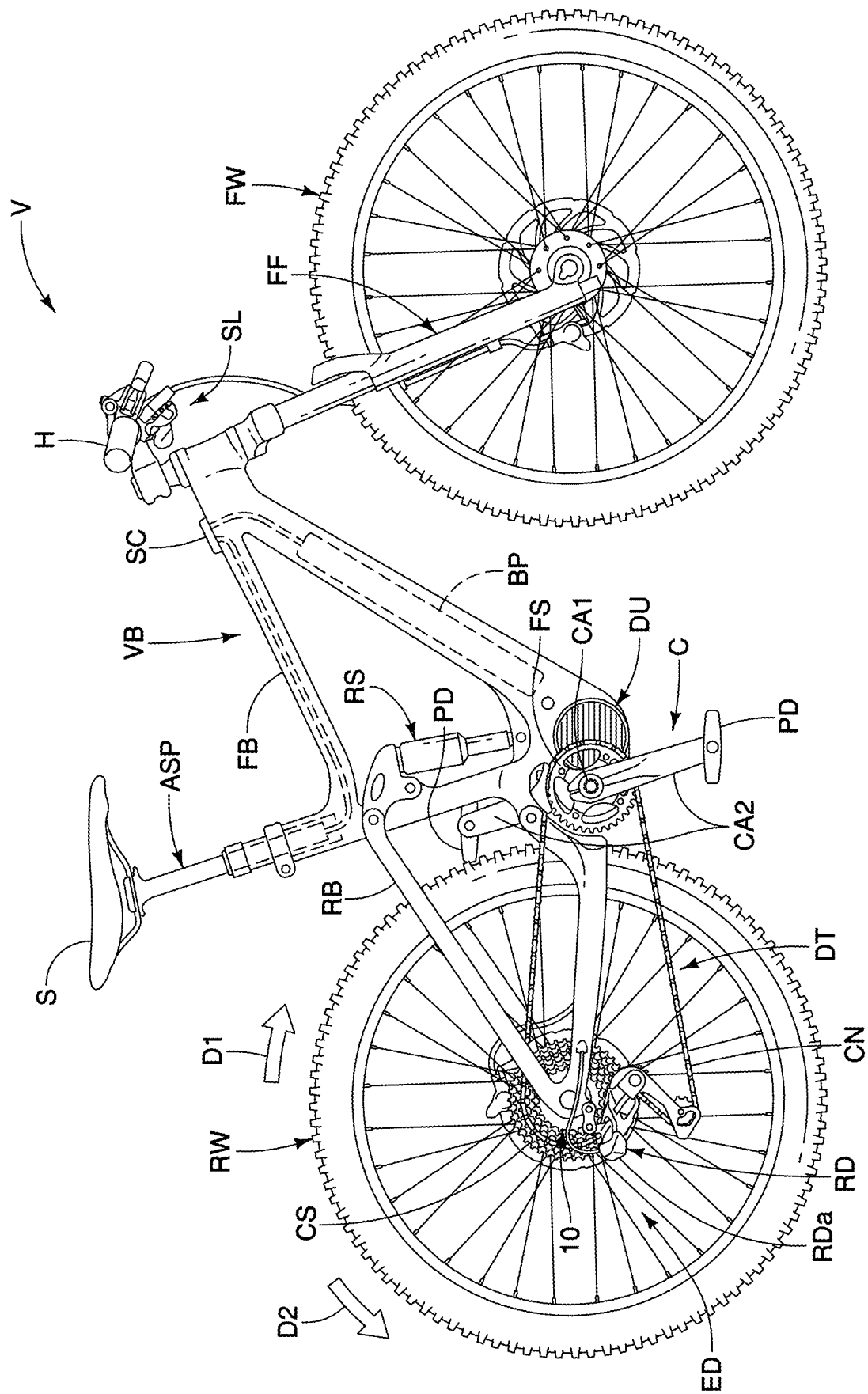
FIG. 1 is a side elevational view of a bicycle (i.e., a human-powered vehicle) equipped with a bicycle part in the form of a hub in accordance with one embodiment of the present disclosure.

Referring initially to FIG. 1, a bicycle V (i.e., a human-powered vehicle) is illustrated that is equipped with an electrical device ED in accordance with an illustrated embodiment. Here, in the illustrated embodiment, the electrical device ED comprises a bicycle part 10 that is a bicycle hub. More specifically, the bicycle part 10 is a bicycle rear hub. Also, here, in the illustrated embodiment, the bicycle part 10 is a hub dynamo (an energy-harvesting power source) for providing electric power to one or more components of the bicycle V. However, the bicycle part 10 is not limited to a hub dynamo. Also, while the bicycle part 10 is illustrated as a rear hub, certain aspects of the bicycle part 10 can be provided to a front hub. Thus, the bicycle part 10 is not limited to a rear hub.

Here, the bicycle V is an electric assist bicycle (E-bike). Alternatively, the bicycle V can be a road bicycle, a city bike, a cargo bike, and a recumbent bike, or another type of off-road bicycle such as a cyclocross bicycle. As seen in FIG. 1, the bicycle V includes a vehicle body VB that is supported by a rear wheel RW and a front wheel FW. The vehicle body VB basically includes a front frame body FB and a rear frame body RB (a swing arm). The vehicle body VB is also provided with a handlebar H and a front fork FF for steering the front wheel FW. The rear frame body RB is swingably mounted to a rear section of the front frame body FB such that the rear frame body RB can pivot with respect to the front frame body FB. The rear wheel RW is mounted to a rear end of the rear frame body RB. A rear shock absorber RS is operatively disposed between the front frame body FB and rear frame body RB. The rear shock absorber RS is provided between the front frame body FB and the rear frame body RB to control the movement of the rear frame body RB with respect to the front frame body FB. Namely, the rear shock absorber RS absorbs shock transmitted from the rear wheel RW. The rear wheel RW is rotatably mounted to the rear frame body RB. The front wheel FW is mounted to the front frame body FB via the front fork FF. Namely, the front wheel FW is mounted to a lower end of the front fork FF. A height adjustable seatpost ASP is mounted to a seat tube of the front frame body FB in a conventional manner and supports a bicycle seat or saddle S in any suitable manner. In the illustrated embodiment, the height adjustable seatpost ASP can be electrically adjustable. The front fork FF is pivotally mounted to a head tube of the front frame body FB. The handlebar H is mounted to an upper end of a steering column or a steerer tube of the front fork FF. The front fork FF absorbs shock transmitted from the front wheel FW. Preferably, the rear shock absorber RS and the front fork FF are electrically adjustable suspensions. For example, the stiffness and/or stoke length of the rear shock absorber RS and the front fork FF can be adjusted.

The bicycle V further includes a drivetrain DT and an electric drive unit DU that is operatively coupled to the drivetrain DT. Here, for example, the drivetrain DT is a chain-drive type that includes a crank C, a front sprocket FS, a plurality of rear sprockets CS and a chain CN. The crank C includes a crank axle CA1 and a pair of crank arms CA2. The crank axle CA1 is rotatably supported to the front frame body FB via the electric drive unit DU. The crank arms CA2 are provided on opposite ends of the crank axle CA1. A pedal PD is rotatably coupled to the distal end of each of the crank arms CA2. The drivetrain DT can be selected from any type, and can be a belt-drive type or a shaft-drive type.

The electric drive unit DU has an electric motor that provides a drive assist force to the front sprocket FS. The electric drive unit DU can be actuated to assist in the propulsion of the bicycle V in a conventional manner. The electric drive unit DU is actuated, for example, in accordance with a human driving force applied to the pedals PD. The electric drive unit DU is actuated by electric power supplied from a main battery pack BP that is mounted on a downtube of the bicycle V. In some cases, the main battery pack BP can provide electrical power to other vehicle components such as the rear derailleur RD, the height adjustable seatpost ASP, the rear shock absorber RS, the front fork FF and any other vehicle component that uses electrical power. In the illustrated embodiment, the bicycle V is illustrated as an electric assist bicycle (E-bike) with the electrical components such as the rear derailleur RD, the height adjustable seatpost ASP, the rear shock absorber RS, the front fork FF, the electric drive unit DU and the like. However, some of the electrical components are optional and do not need to be provided to the bicycle V for a different configuration. In different cases, the electrical components, such as the rear derailleur RD, the height adjustable seatpost ASP, the rear shock absorber RS, the front fork FF, the electric drive unit DU and the like, are also optional and selectively provided to the bicycle V as needed and/or desired. For example, in the case of the city bike, the bicycle V can be configured without the height adjustable seatpost ASP, the rear shock absorber RS.

The bicycle V further includes a cycle computer SC. Here, the cycle computer SC is mounted to the front frame body FB. Alternatively, the cycle computer SC can be provided on the handlebar H. The cycle computer SC notifies the rider of various traveling and/or operating conditions of the bicycle V. The cycle computer SC can also include various control programs for automatically controlling one or more vehicle components. For example, the cycle computer SC can be provided with an automatic shifting program for changing gears of the rear derailleur RD based on one or more traveling and/or operating conditions of the bicycle V.

Here, in the illustrated embodiment, the electrical device ED further includes the rear derailleur RD (e.g., the component) that is attached to the rear frame body RB for shifting the chain CN between the rear sprockets CS. The rear derailleur RD is one type of gear changing device. Here, the rear derailleur RD is an electric derailleur (i.e., an electric gear changing device or an electric transmission device), and has an electric motor or actuator RDa. Here, the rear derailleur RD is provided on the rear side of the rear frame body RB near the bicycle part 10. The rear derailleur RD can be operated when a rider of the bicycle V manually operates a gear shift operating device or shifter SL (e.g., an operating member). Thus, in the illustrated embodiment, the rear derailleur RD has the actuator RDa activated in response to operation of the shifter SL. The rear derailleur RD can also be automatically operated based on traveling conditions and or operating conditions of the bicycle V. The bicycle V can further include a plurality of other electronic components. Some or all of the electronic components can be supplied with electric power generated by the bicycle part 10 during a power generation state as discussed herein. Thus, in the illustrated embodiment, the bicycle V has a system for a human-powered vehicle that comprises the electrical device ED that includes the bicycle part 10 and the electronic components.

The structure of the bicycle part 10 of the electrical device ED will now be described with particular reference to FIGS. 2 to 4. Here, the bicycle part 10 of the electrical device ED further comprises a hub axle 12, and a hub body 14. The hub axle 12 has a center axis A1. The hub axle 12 is configured to be non-rotatably attached to the vehicle body VB. In this embodiment, the hub axle 12 is configured to be non-rotatably attached to the rear frame body RB. The hub body 14 is rotatably provided with respect to the hub axle 14. Specifically, the hub body 14 is rotatably disposed around the center axis A1. In other words, the hub body 14 is rotatably mounted around the hub axle 12.

Figure 2:
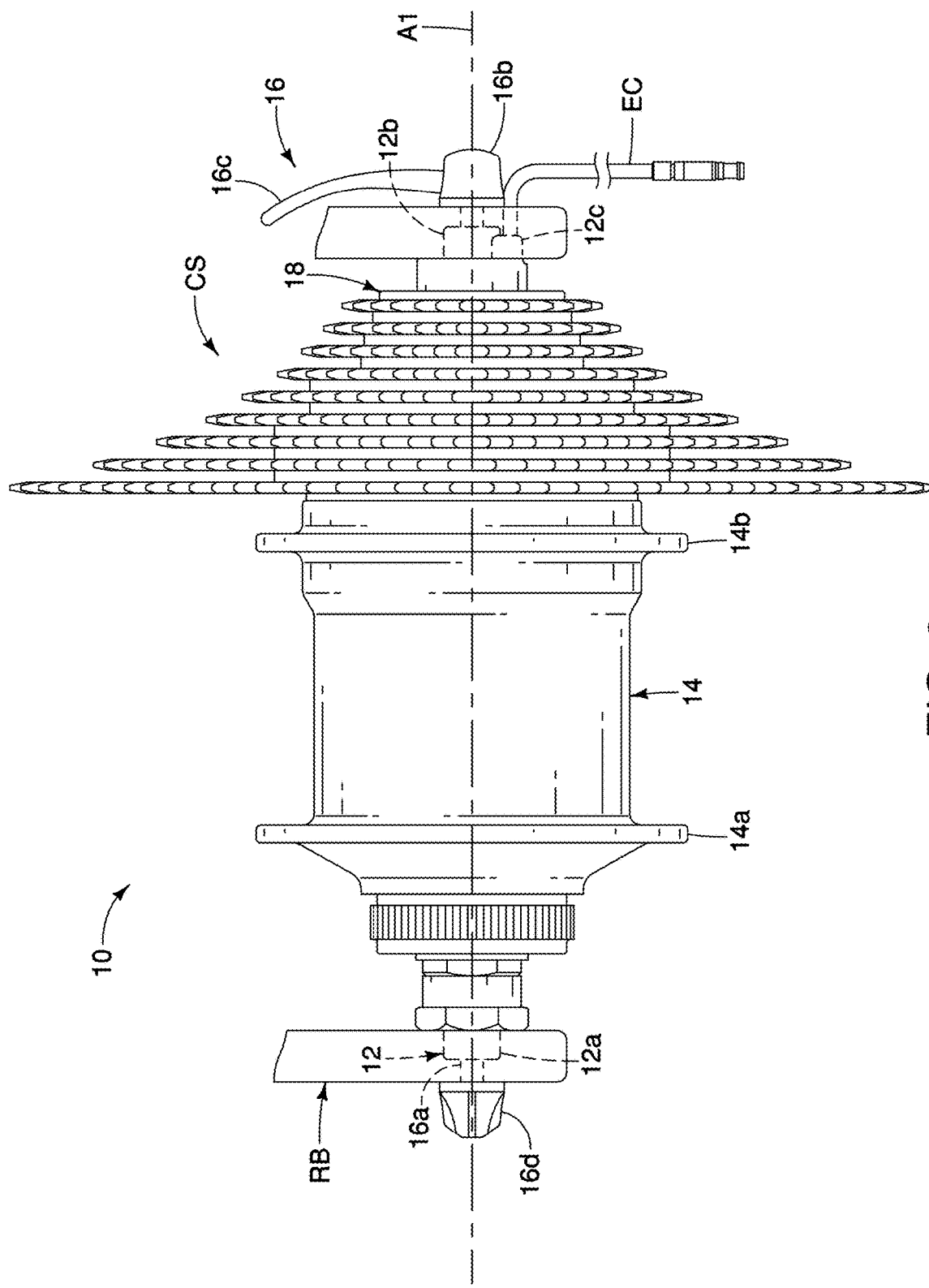
FIG. 2 is a longitudinal elevational view of the hub attached to the vehicle body of the human-powered vehicle illustrated in FIG. 1.
Figure 3:
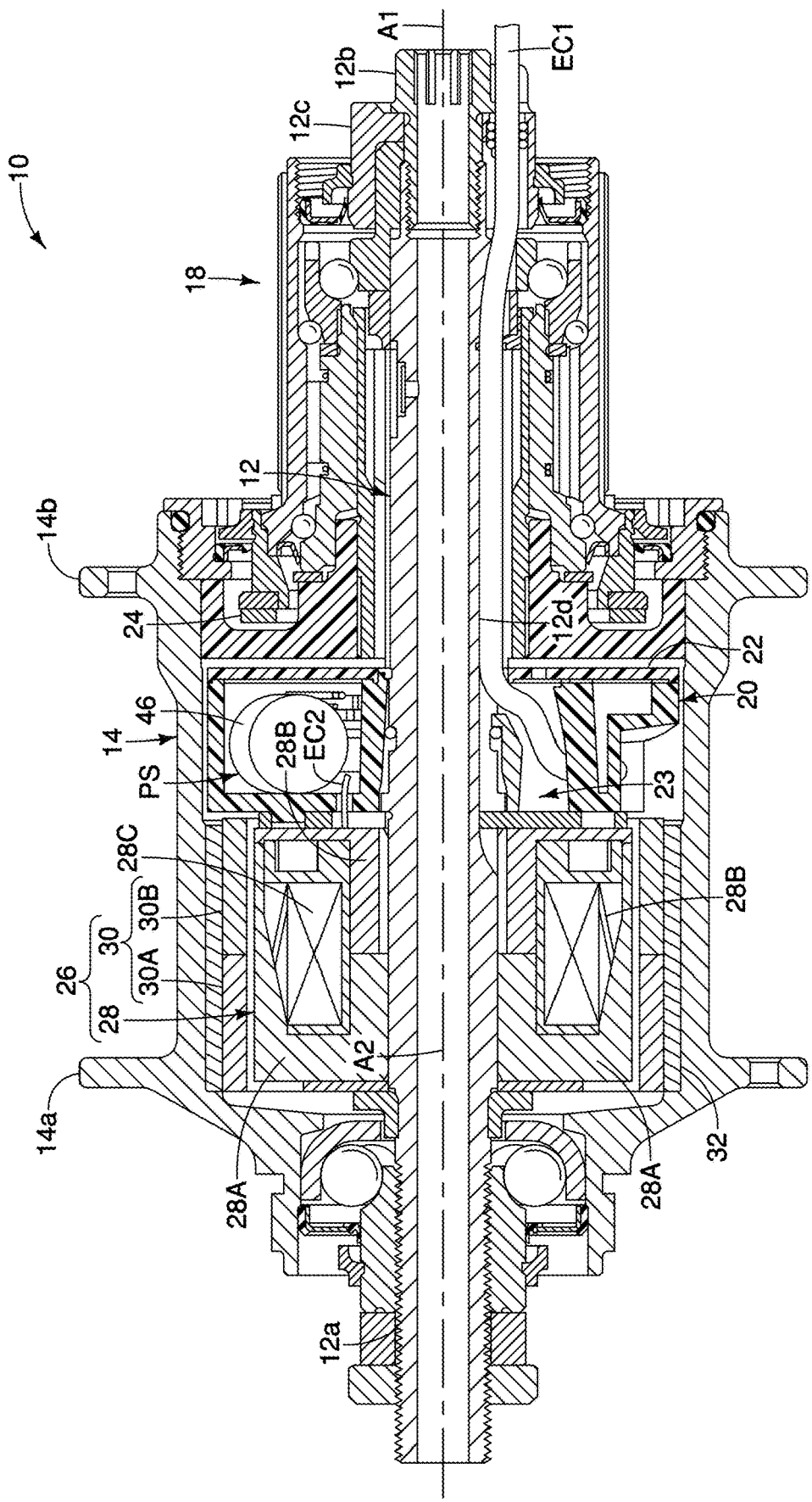
FIG. 3 is a longitudinal cross-sectional view of the hub illustrated in FIG. 2.
Figure 4:
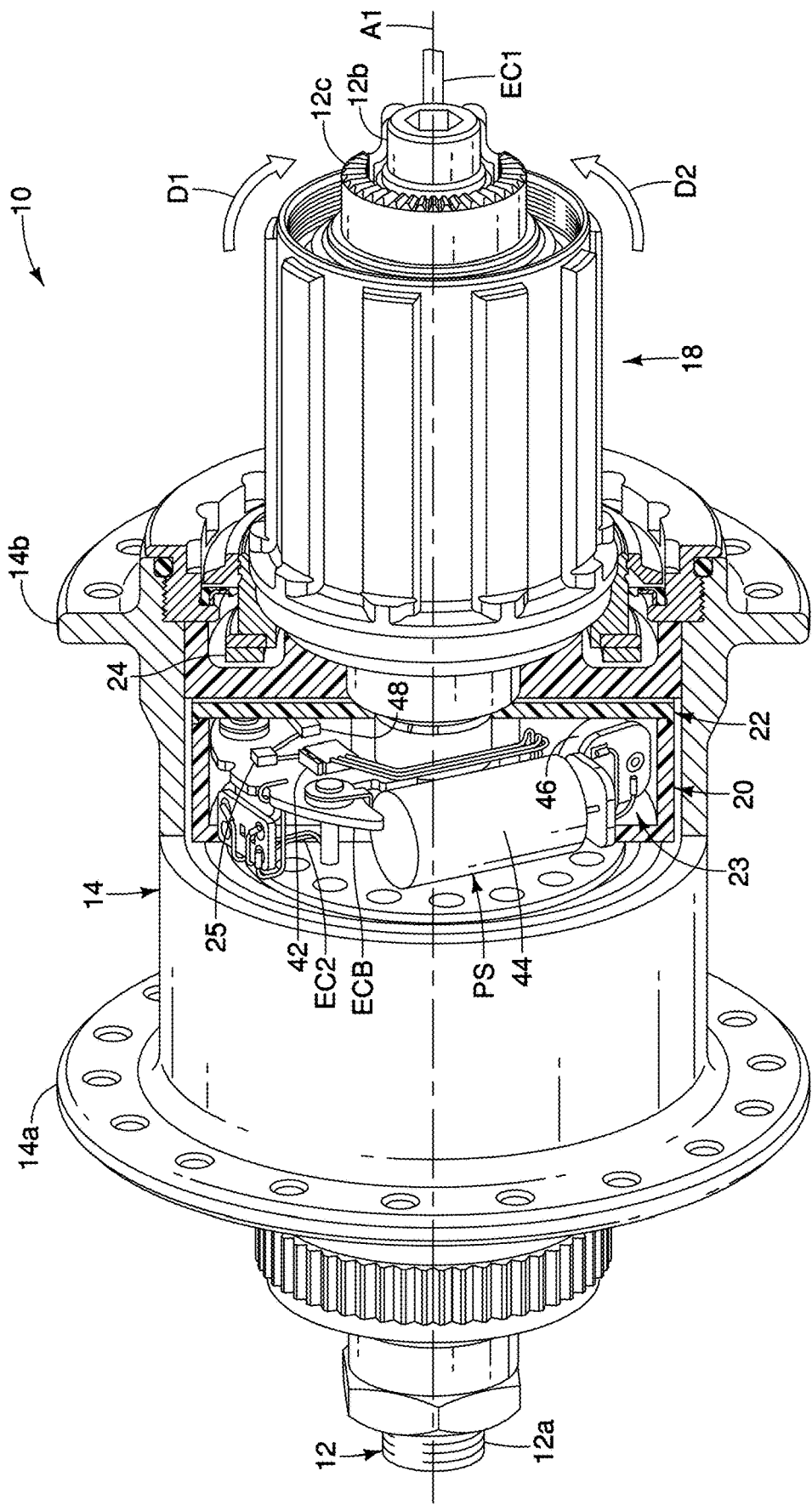
FIG. 4 is a perspective view of the hub illustrated in FIGS. 2 to 4 with portions broken way to show an electronic circuit board.

As seen in FIGS. 2 to 4, the hub axle 12 is a rigid member made of a suitable material such as a metallic material. Here, the hub axle 12 is a tubular member. The hub axle 12 can be a one-piece member or made of several pieces. Here, the hub axle 12 includes a main body 12a and an end piece 12b. The end piece 12b is threadedly mounted to a first end (right side in FIGS. 2 to 4) of the main body 12a. In this way, the second end (left side in FIGS. 2 to 4) of the main body 12a and the end piece 12b are received in mounting openings of the rear frame body RB as seen in FIG. 2. Here, the hub axle 12 further includes a rotation restriction member 12c which is coupled to the main body 12a by the end piece 12b. The rotation restriction member 12c engages the rear frame body RB so that rotation of the hub axle 12 relative to the rear frame body RB is restricted.

Here, as seen in FIG. 2, the bicycle part 10 further comprises a wheel holding mechanism 16 for securing the hub axle 12 of the bicycle part 10 to the rear frame body RB. The wheel holding mechanism 16 basically includes a shaft or skewer 16a, a cam body 16b, a cam lever 16c and an adjusting nut 16d. The cam lever 16c is attached to one end of the skewer 16a via the cam body 16b, while the adjusting nut 16d is threaded on the other end of the skewer 16a. The lever 16c is attached to the cam body 16b. The cam body 16b is coupled between the skewer 16a and the cam lever 16c to move the skewer 16a relative to the cam body 16b. Thus, the lever 16c is operated to move the skewer 16a in the axial direction of the center axis A1 with respect to the cam body 16b to change the distance between the cam body 16b and the adjusting nut 16d. Preferably, a compression spring is provided at each end of the skewer 16a. Alternatively, the hub axle 12 can be non-rotatably attached to the rear frame body RB with other attachment structures as needed and/or desired.

As indicated in FIGS. 1 and 4, the hub body 14 is rotatably mounted around the hub axle 12 to rotate in a driving rotational direction D1. The driving rotational direction D1 corresponds to a forward driving direction of the rear wheel RW. The hub body 14 is configured to support the rear wheel RW in a conventional manner. More specifically, in the illustrated embodiment, the hub body 14 includes a first outer flange 14a and a second outer flange 14b. The first outer flange 14a and the second outer flange 14b extend radially outward with respect to the center axis A1. The first outer flange 14a and the second outer flange 14b are configured to receive a plurality of spokes (FIG. 1) for attaching a rim (FIG. 1) of the rear wheel RW to the hub body 14. In this way, the hub body 14 and the rear wheel RW are coupled to rotate together.

Here, the bicycle part 10 further comprises a sprocket support structure 18. In the illustrated embodiment, the sprocket support structure 18 supports the rear sprockets CS as seen in FIG. 2. The sprocket support structure 18 is rotatably disposed around the center axis A1 to transmit a driving force to the hub body 14 while rotating in a driving rotational direction D1 around the center axis A1. As explained below, the sprocket support structure 18 does not transmit a driving force to the hub body 14 while rotating in a non-driving rotational direction D2 around the center axis A1. The non-driving rotational direction D2 is opposite to the driving rotational direction D1 with respect to the center axis A1. The center rotational axis of the sprocket support structure 18 is disposed concentrically with the center axis A1 of the hub axle 12.

While the sprocket support structure 18 is configured to non-rotatably support the rear sprockets CS, the sprocket support structure 18 is not limited to the illustrated embodiment. Alternatively, one or more of the rear sprockets CS can be integrally formed with the sprocket support structure 18. In any case, the sprocket support structure 18 and the rear sprockets CS are coupled together to rotate together in both the driving rotational direction D1 and the non-driving rotational direction D2.

As seen in FIGS. 3 and 4, the bicycle part 10 comprises a housing 20. The housing 20 is configured to house various electrical components. The housing 20 defines an internal space 23 that has a donut shape. In the illustrated embodiment, the bicycle part 10 comprises an electronic circuit board ECB (e.g., a control device) and an electric power storage PS (e.g., an electric power storage device). The electronic circuit board ECB is provided in the internal space 23 of the housing 20. The electric power storage PS is provided in the internal space 23 of the housing 20. Thus, in the illustrated embodiment, the electric power storage PS is accommodated inside the hub body 14. In particular, the electronic power storage PS is disposed on or adjacent to the electronic circuit board ECB. For example, the electric power storage PS is provided to the hub axle 12. The electronic circuit board ECB is electrically connected to the electric power storage PS for controlling the input and output of electric power from the electric power storage PS. A first electrical cable EC1 is electrically connected at one end to the electronic circuit board ECB. The other end of the first electrical cable EC1 is electrically connected to another electrical component of the bicycle V such as the rear derailleur RD, the battery pack BP or an electrical junction. In this way, the first electrical cable EC1 can provide electric power generated by the bicycle part 10 to the rear derailleur RD, the battery pack BP or another electrical component. The first electrical cable EC1 can also be used to transmit signals using power line communication (PLC). In the illustrated embodiment, the electric power storage PS is accommodated inside the hub body 14. However, the location of the electric power storage PS is not limited to this location. The electric power storage PS can be disposed outside the hub body 14 or any other location on the vehicle body VB as long as the electric power storage PS is electrically connected to the electronic circuit board ECB.

The hub axle 12 supports the housing 20. Here, the housing 20 is non-rotatably with respect to the hub axle 12. The bicycle part 10 further comprises a lid 22. The lid 22 is coupled to the housing 20.

In the illustrated embodiment, the bicycle part 10 further comprises a detected part 24 and a rotation detection sensor 25. The detected part 24 is provided to the sprocket support structure 18. On the other hand, the rotation detection sensor 25 is provided in the internal space 23 of the housing 20. The rotation detection sensor 25 is configured to detect the detected part 24 to detect rotation of the sprocket support structure 18 around the center axis A1. Since the rotation detection sensor 25 is on the electronic circuit board ECB, the rotation detection sensor 25 are non-rotatable with respect to the hub axle 12. As seen in FIG. 4, the rotation detection sensor 25 is disposed in the hub body 14 at a location spaced radially outward from the hub axle 12.

In the illustrated embodiment, the rotation detection sensor 25 includes a magnetic sensor, and the detected part 24 includes a magnet. Thus, the magnetic sensor detects movement of the magnet, which rotates together with the sprocket support structure 18. In other words, with this arrangement, the rotation detection sensor 25 is configured to detect the detected part 24 to detect rotation of the sprocket support structure 18 around the center axis A1. Here, the magnet of the detected part 24 is an annular member with alternating S-pole sections and N-pole sections. In this way, the rotation detection sensor 25 can detect a rotational amount and a rotational direction of the rear sprockets CS that are coupled to the sprocket support structure 18. The term "sensor" as used herein refers to a hardware device or instrument designed to detect the presence or absence of a particular event, object, substance, or a change in its environment, and to emit a signal in response. The term "sensor" as used herein do not include a human. The rotation detection sensor 25 receives electric power from the electric power storage PS.

As seen in FIG. 3, the bicycle part 10 further comprises an electric power generator 26 (e.g., a generator). The electric power generator 26 is disposed between the hub axle 12 and the hub body 14. The electric power generator 26 is configured to output electrical power. Specifically, the electric power generator 26 is configured to generate electric power by rotation of the hub body 14 relative to the hub axle 12. More specifically, the electric power generator 26 is disposed in the hub body 14 between the hub axle 12 and a center portion of the hub body 14. The electronic circuit board ECB is electrically connected to the electric power generator 26 for controlling the electric power output of the electric power generator 26. In particular, a second electrical cable EC2 is electrically connects the electronic circuit board ECB to the electric power generator 26. Thus, in the illustrated embodiment, the electric power storage PS is electrically connected to the electric power generator 26.

The electric power generator 26 basically includes an armature 28 (i.e., a stator in the illustrated embodiment) and a magnet 30 (i.e., a rotor in the illustrated embodiment). While the armature 28 is illustrated as being fixed with respect to the hub axle 12 and the magnet 30 is illustrated as being fixed with respect to the hub body 14, the armature 28 can be fixed with respect to the hub body 14 and the magnet 30 can be fixed with respect to the hub axle 12. The armature 28 includes a first yoke 28A, a second yoke 28B and a coil 28C. The first yoke 28A includes two or more first yoke pieces that are arranged in the circumferential direction of the hub axle 12. Likewise, the second yoke 28B includes two or more second yoke pieces that are arranged in the circumferential direction of the hub axle 12 and that alternate with the first yoke pieces of the first yoke 28A. The coil 28C is located between the first yoke 28A and the second yoke 28B. The magnet 30 includes a plurality of first magnet parts 30A and a plurality of second magnet parts 30B arranged inside a tubular support 32. The tubular support 32 fixedly coupled to the inside of the hub body 14 so that the magnet 30 and the hub body 14 rotate together around the hub axle 12. The first magnet parts 30A and the second magnet parts 30B are arranged so that S-poles and N-poles of the first magnet parts 30A and the second magnet parts 30B are alternately arranged in the circumferential direction of the hub axle 12. Therefore, the S-poles of the first magnet parts 30A are not aligned with the S-poles of the second magnet parts 30B, and the N-poles of the first magnet parts 30A are not aligned with the N-poles of the second magnet parts 30B in the axial direction of the shaft member 12.

The electronic circuit board ECB comprises an electronic controller 42 (e.g., a controller). The electronic controller 42 is provided on the electronic circuit board ECB. The electronic controller 42 is configured to receive a detection signal from the rotation detection sensor 25. The electronic controller 42 includes at least one processor that executes predetermined control programs. The at least one processor can be, for example, a central processing unit (CPU) or a micro processing unit (MPU). The term "electronic controller" as used herein refers to hardware that executes a software program, and does not include a human. The electronic controller 42 receives electric power from at least one of the electric power generator 26 and the electric power storage PS. Thus, in the illustrated embodiment, the electronic controller 42 is electrically connected to at least one of the electric power generator 26 and the electric power storage PS. The electronic controller 42 is configured to control the electric power generated by the electric power generator 26 and control the electric power supplied from the electric power storage PS. In the illustrated embodiment, as seen in FIG. 4, the electronic circuit board ECB is provided in the internal space 23 of the housing 20 within the hub body 14, and thus the electronic controller 42 is also provided to the hub body 14.

In the illustrated embodiment, the electric power storage PS includes a plurality of capacitors (e.g., electric power storage elements) connected in series relative to each other. Specifically, the electric power storage PS includes a first capacitor 44 and a second capacitor 46. In the illustrated embodiment, the first capacitor 44 and the second capacitor 46 are a lithium-ion capacitor (LIC), for example. The electronic controller 42 is configured to control the storage of the electric power generated by the electric power generator 26 in the first capacitor 44 and the second capacitor 46. The electronic controller 42 is configured to control the distribution of the electric power stored in the first capacitor 44 and the second capacitor 46 to other components. Thus, the electric power generated by the electric power generator 26 can be stored and/or supplied directly to other components such as the rotation detection sensor 25, the rear derailleur RD, etc. Specifically, in the illustrated embodiment, the bicycle V (e.g., the human-powered vehicle) includes the electric power generator 26, the electric power storage PS, and the rear derailleur RD (e.g., the component), and the rear derailleur RD has the actuator RDa actuated by electrical power from at least one of the electric power generator 26 and the electric power storage PS.

Preferably, as seen in FIG. 4, the electronic circuit board ECB further includes a data storage device 48 that provided on the electronic circuit board ECB. The data storage device 48 stores various control programs and information used for various control processes including operation state control, power generation control, power storage control, hub rotation detection control, etc. The data storage device 48 includes any computer storage device or any non-transitory computer-readable medium with the sole exception of a transitory, propagating signal. For example, the data storage device 48 includes a nonvolatile memory and a volatile memory. The nonvolatile memory includes, for example, at least one of a read-only memory (ROM), an erasable programmable read only memory (EPROM), an electrically erasable programmable read-only memory (EEPROM), and a flash memory. The volatile memory includes, for example, a random access memory (RAM).

Figure 5:
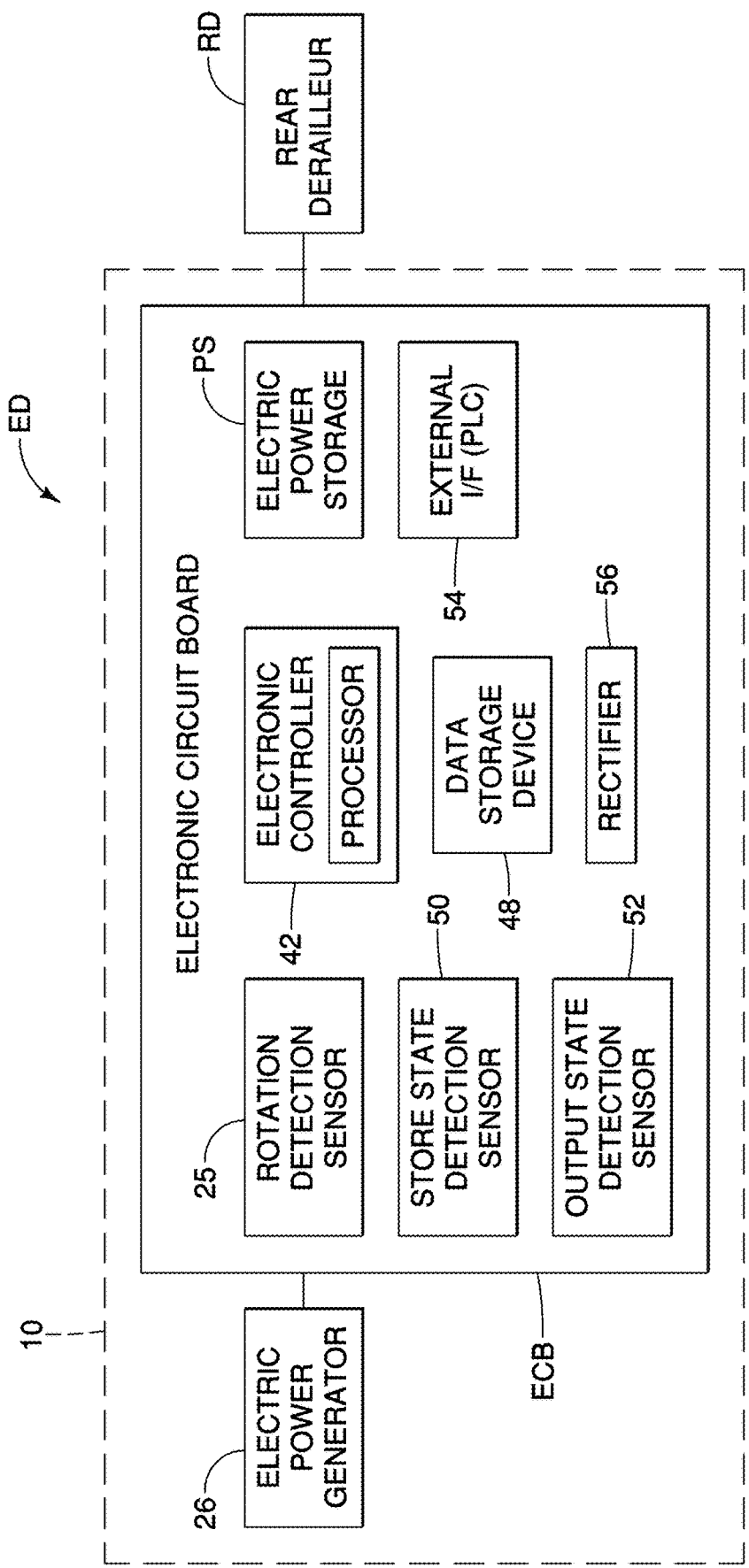
FIG. 5 is a block diagram of the electronic circuit board.

Although not shown in FIG. 4, the electronic circuit board ECB further includes various sensors and electronic components. FIG. 5 illustrates a block diagram of the electrical device ED. In the illustrated embodiment, the electrical device ED comprises the bicycle part 10 and the electrical components, such as the rear derailleur RD. Thus, in the illustrated embodiment, the electrical device ED comprises the electronic circuit board ECB (e.g., the control device) and the rear derailleur RD (e.g., the component). As seen in FIG. 5, the electronic circuit board ECB further includes a store state detection sensor 50. The store state detection sensor 50 detects a store or charge state of the electric power storage PS. Specifically, the store state detection sensor 50 detects a stored electric power value of the electric power storage PS. More specifically, in the illustrated embodiment, the store state detection sensor 50 detects output voltage of the electric power storage PS, and outputs the detection result to the electronic controller 42. However, in the illustrated embodiment, the store state detection sensor 50 is not limited to this. The store state detection sensor 50 can be any sensors that detect a value that can be converted to the output voltage of the electric power storage PS.

As seen in FIG. 5, the electronic circuit board ECB further includes an output state detection sensor 52. The output state detection sensor 52 detects an output state of the electric power generator 26. Specifically, the output state detection sensor 52 detects alternate current from the electric power generator 26, and outputs pulses (i.e., vehicle speed pulses) corresponding to the frequency of the alternate current from the electric power generator 26 to the electronic controller 42. The vehicle speed pulses can be counted by the electronic controller 42 to determine a rotational speed of the rear wheel RW, which corresponds to a forward speed of the bicycle V and electric power generated by the electric power generator 26. However, in the illustrated embodiment, the output state detection sensor 52 is not limited to this. The output state detection sensor 52 can be any sensors that detect a value that can be converted to the rotational speed of the rear wheel RW.

As also seen in FIG. 5, the electronic circuit board ECB further includes an external interface (I/F) 54. The external I/F 54 includes an electrical port for transmitting electric power to the electrical components of the bicycle V and for receiving electric power from external power source for various purposes, such as a maintenance of the electrical device ED of the bicycle V. Furthermore, the external I/F can transmit signals to the electrical components of the bicycle V and receive signals from the electrical components of the bicycle V using the power line communication (PLC). In the illustrated embodiment, the electronic controller 42 is configured to control the rear derailleur RD in either manual control mode or in automatic control mode. In the manual control mode, the electronic controller 42 is configured to perform a gear shift control in response to a manual input using the shifter SL. Specifically, the electronic controller 42 is configured to receive a shift command from the shifter SL via the external I/F 54 in response to the manual input using the shifter SL, and transmit the shift command to the rear derailleur RD via the externa I/F 54 to operate the actuator RDa of the rear derailleur RD. On the other hand, in the automatic control mode, the electronic controller 42 is configured to automatically generate the shift command based on at least one of a cadence, a bicycle running speed, and a gear ratio, and transmit the shift command to the rear derailleur RD via the external I/F 54 to operate the actuator RDa of the rear derailleur RD. Alternatively, these shift command can be obtained from the cycle computer SC via the external I/F 54.

Figure 6:
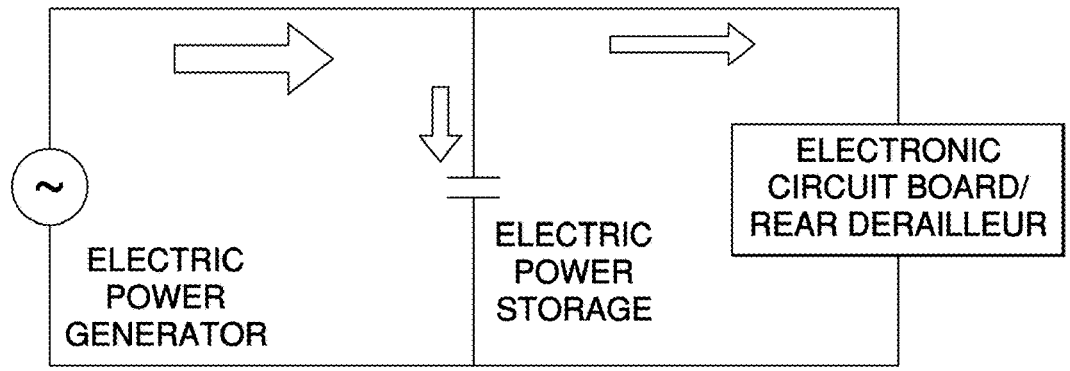
FIG. 6 is a schematic circuit diagram illustrating an electrical connection of an electric power generator, an electric power storage, an electronic circuit board and a rear derailleur, showing a state in which a forward speed of the bicycle is high enough such that charging current generated by the electric power generator is larger than current consumption by the electronic circuit board and the rear derailleur.
Figure 7:
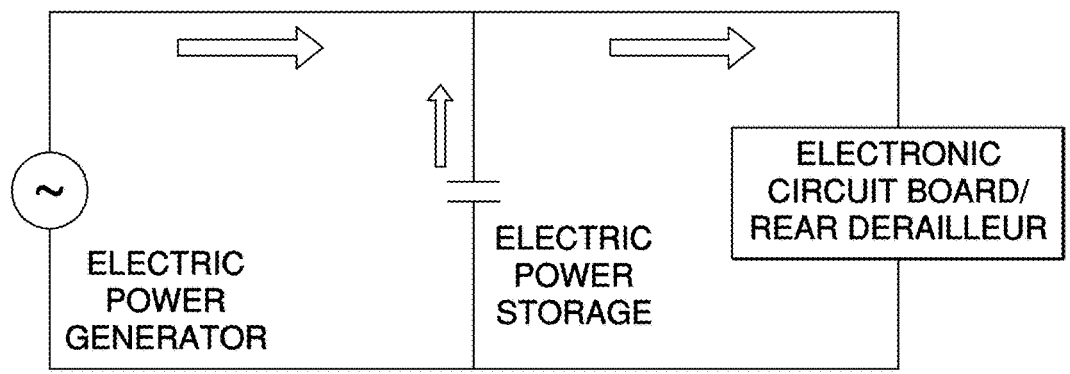
FIG. 7 is a schematic circuit diagram illustrating the electrical connection of the electric power generator, the electric power storage, the electronic circuit board and the rear derailleur, showing a state without an operation state control in accordance with the embodiment of the present disclosure, in which the forward speed of the bicycle is decreased such that the charging current generated by the electric power generator is smaller than the current consumption by the electronic circuit board and the rear derailleur.
Figure 8:
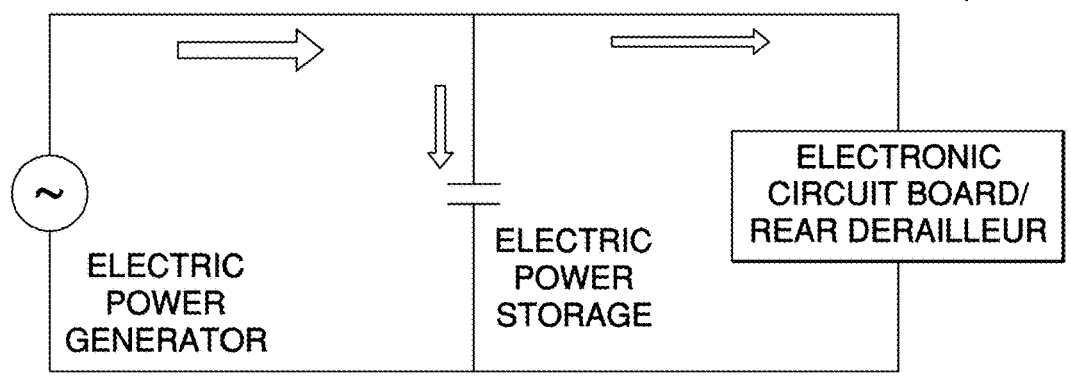
FIG. 8 is a schematic circuit diagram illustrating the electrical connection of the electric power generator, the electric power storage, the electronic circuit board and the rear derailleur, showing a state with the operation state control in accordance with the embodiment of the present disclosure, in which the forward speed of the bicycle is decreased, but the charging current generated by the electric power generator is maintained larger than current consumption by the electronic circuit board and the rear derailleur.

In the illustrated embodiment, the electronic controller 42 is configured to control an operation state of the rear derailleur RD in accordance with information relating to at least one of the output state of the electric power generator 26 and the store state of the electric power storage PS. FIGS. 6-8 are schematic circuit diagrams illustrating an electrical connection of the electric power generator 26, the electric power storage PS, the electronic circuit board ECB and the rear derailleur RD. FIG. 6 illustrates a state in which the electronic controller 42 controls the rear derailleur RD in a normal operation state while the forward speed of the bicycle V is high enough such that the charging current generated by the electric power generator 26 at this forward speed is larger than the current consumption by the electronic circuit board ECB and the rear derailleur RD. In this case, if the forward speed of the bicycle V decreases and the charging current generated by the electric power generator 26 at this forward speed becomes smaller than the current consumption by the electronic circuit board ECB and the rear derailleur RD, then, as shown in FIG. 7, the electric power discharged from the electric power storage PS is used to control the rear derailleur RD in the normal operation state. However, in this case, the operable time period of the rear derailleur RD is limited according to the capacity and/or the store state of the electric power storage PS, and thus it will be difficult to ensure enough operable time.

On the other hand, in the illustrated embodiment, if the forward speed of the bicycle V decreases and the charging current generated by the electric power generator 26 at this forward speed becomes smaller than the current consumption by the electronic circuit board ECB and the rear derailleur RD operated in the normal operation state, then, as shown in FIG. 8, the electronic controller 42 switches the operation state from the normal operation state to a power-saving operation state to limit the functionality of the electronic circuit board ECB and the rear derailleur RD to suppress the current consumption by the electronic circuit board ECB and the rear derailleur RD. With this operation state control, the charging current generated by the electric power generator 26 at this forward speed becomes larger than the current consumption by the electronic circuit board ECB and the rear derailleur RD operated in the power-saving operation state, which ensures enough operable time period. In particular, with this operation state control, the functionality of the rear derailleur RD is limited by limiting the function and/or the performance (e.g., clock rate) of the electronic controller 42 that transmits the shift command to the rear derailleur RD and reducing a response speed of the rear derailleur RD, for example. Furthermore, in the illustrated embodiment, if the forward speed of the bicycle V further decreases, then, the electronic controller 42 can further switch the operation state to a power-off operation state to further suppress the current consumption by the electronic circuit board ECB and the rear derailleur RD.

Figure 9:
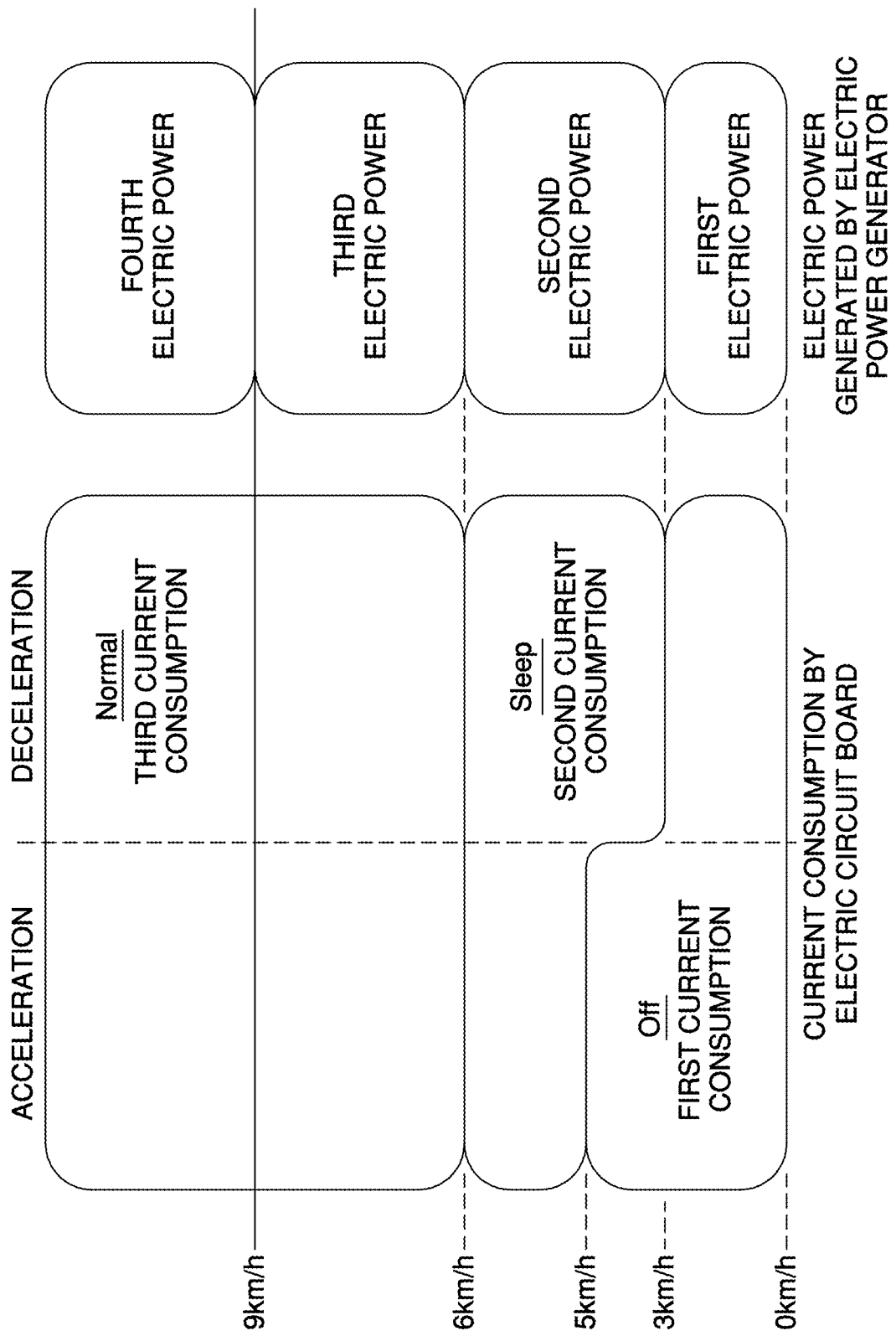
FIG. 9 is a diagram illustrating that electric power generated by the electric power generator changes according to the forward speed of the bicycle.

FIG. 9 is a diagram illustrating example values of electric power generated by the electric power generator 26 according to the forward speed of the bicycle V. Specifically, as seen in FIG. 9, a first electric power generated by the electric power generator 26 while the forward speed of the bicycle V is between 0-3 km/h is smaller than a second electric power generated by the electric power generator 26 while the forward speed of the bicycle V is between 3-5 km/h, the second electric power is smaller than a third electric power generated by the electric power generator 26 while the forward speed of the bicycle V is between 6-9 km/h, and the third electric power is smaller than a fourth electric power generated by the electric power generator 26 while the forward speed of the bicycle V is greater than 9 km/h. In the illustrated embodiment, the first electric power is 0 mA, the second electric power is between 0-11.4 mA at 6.1V, the third electric power is between 11.4-40 mA at 6.1-7V, and the fourth electric power is more than 40 mA at more than 7V, for example. Of course, these values are provided as example values, and are not provided for the purpose of limiting the inventions. Thus, these values can be different for different configurations. For example, the first electric power can be between 0-3 mA, the second electric power can be between 0-20 mA at 5-7V, the third electric power can be between 7.5-60 mA at 5-9V, and the fourth electric power can be more than 7.5 mA at more than 5V. However, basically, the electric power generator 26 can generate more electric power as the forward speed of the bicycle V increases.

In the illustrated embodiment, the electronic controller 42 controls the operation state of the rear derailleur RD according to the electric power generated by the electric power generator 26. Specifically, since the electric power generated by the electric power generator 26 changes according to the forward speed of the bicycle V, as mentioned above, the electronic controller 42 controls the operation state of the rear derailleur RD according to the forward speed of the bicycle V in the illustrated embodiment. In the illustrated embodiment, the electronic controller 42 switches the operation state to the power-off operation state, in which the current consumption by the electric circuit board ECB is a first current consumption, the power-saving operation state, in which the current consumption by the electric circuit board ECB is a second current consumption that is greater than the first current consumption, or the normal operation state, in which the current consumption by the electric circuit board ECB is a third current consumption that is greater than the second current consumption, according to the forward speed of the bicycle V. In the illustrated embodiment, the first current consumption is less than 0.1 uA, the second current consumption is between 0.1 uA-2 mA, and the third current consumption is 18.3 mA, for example. Of course, these values are provided as example values, and are not provided for the purpose of limiting the inventions. Thus, these values can be different for different configurations. For example, the first current consumption can be less than 0.5 uA, the second current consumption can be more than the first current consumption and less than 5 mA, and the third current consumption can be more than the second current consumption and between 5-25 mA.

More specifically, as seen in FIG. 9, when the bicycle V is accelerating, the electronic controller 42 switches the operation state to the power-off operation state while the forward speed of the bicycle V is between 0-5 km/h, switches the operation state to the power-saving operation state while the forward speed of the bicycle V is between 5-6 km/h and switches the operation state to the normal operation state while the forward speed of the bicycle V is greater than 6 km/h, for example. On the other hand, seen in FIG. 9, when the bicycle V is decelerating, the electronic controller 42 switches the operation state to the normal operation state while the forward speed of the bicycle V is greater than 6 km/h, switches the operation state to the power-saving operation state while the forward speed of the bicycle V is between 3-6 km/h and switches the operation state to the power-off operation state while the forward speed of the bicycle V is between 0-3 km/h, for example. Of course, these values are provided as example values, and are not provided for the purpose of limiting the inventions. However, basically, the electronic controller 42 can switch the operation state to an operation state that consumes more electric power (e.g., the normal operation state) as the forward speed of the bicycle V increases and the electric power generator generates more electric power, while the electronic controller 42 can switch the operation state to an operation state that consumes less electric power (e.g., the power-saving operation state or the power-off operation state) as the forward speed of the bicycle V decreases and the electric power generator generates less electric power.

Figure 10:
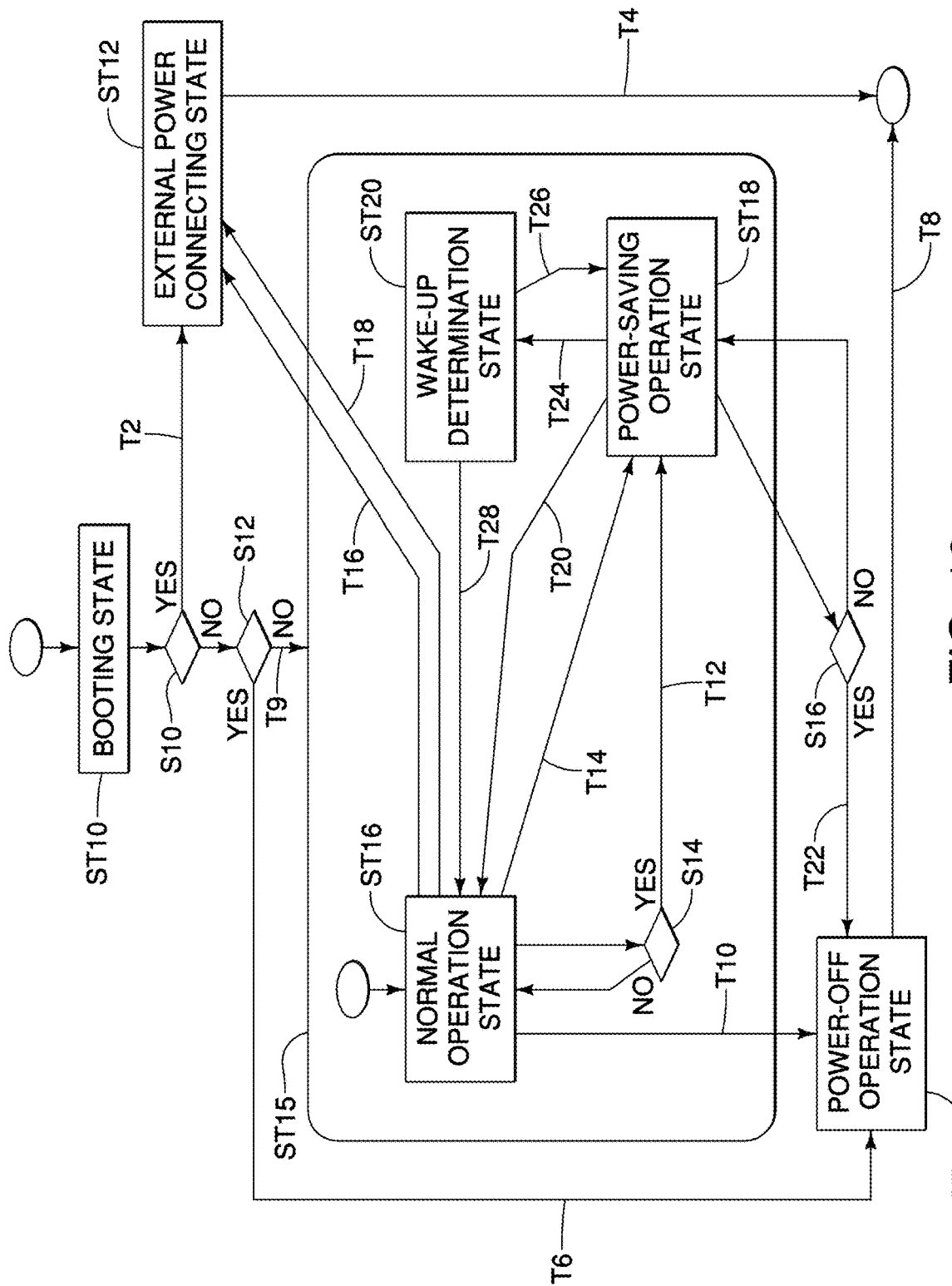
FIG. 10 is a state transition diagram illustrating the operation state control in accordance with the embodiment of the present disclosure.

Referring further to FIG. 10, the operation state control by the electronic controller 42 will be described in detail. FIG. 10 illustrates a state transition diagram of the operation state control. Before the electronic controller 42 starts the operation state control, the electronic controller 42 continuously monitors the connection of the external electric power to the external I/F, the rotational speed of the rear wheel RW and the output voltage of the electric power storage PS, for example.

Specifically, the electronic controller 42 monitors whether external electric power that is equal to or more than a predetermined electric power value is supplied from the external I/F. In the illustrated embodiment, the predetermined electric power value is 4.5V, for example. However, the predetermined electric power value is not limited to this, and can be different as needed and/or desired. For example, the predetermined electric power value can be a value between 3.5-5.5V. The electronic controller 42 monitors whether the rotational speed of the rear wheel RW is equal to or more than a predetermined speed value. In the illustrated embodiment, the predetermined speed value is 36 rpm, for example. However, the predetermined speed value is not limited to this, and can be different as needed and/or desired. For example, the predetermined speed value can be a value between 30-40 rpm. The electronic controller 42 also monitors whether the output voltage of the electric power storage PS is equal to or more than a predetermined electric power value. In the illustrated embodiment, the predetermined electric power value is 4.6V, for example. However, the predetermined electric power value is not limited to this, and can be different as needed and/or desired. For example, the predetermined electric power value can be a value between 3.6-5.6V.

If the electronic controller 42 determines that external electric power that is equal to or more than 4.5V is supplied from the external I/F, or if the electronic controller 42 determines that the rotational speed of the rear wheel RW is equal to or more than 36 rpm and that the output voltage of the electric power storage PS is equal to or more than 4.6V, then the electronic controller 42 starts the operation state control.

First, the electronic controller 42 operates in a booting state ST10. During the booting state ST10, the electronic controller 42 allows the electric power discharge from the electric power storage PS ("LIC discharge=ON") and prohibits the electric power discharge from the external I/F ("PLC discharge=OFF"). Then, the electronic controller 42 starts a booting process to initialize the various components of the electrical device ED.

When the booting process is completed, then the electronic controller 42 monitors the voltage level at the external I/F (i.e., "PLC voltage"), and determines whether the voltage level at the external I/F is equal to or more than a predetermined electric power value (step S10). In the illustrated embodiment, the predetermined electric power value is 3V, for example. However, the predetermined electric power value is not limited to this, and can be different as needed and/or desired. For example, the electric power value can be a value between 2-4V.

If the electronic controller 42 determines that the voltage level at the external I/F is equal to or more than 3V ("YES" in step S10), then the electronic controller 42 controls the operation state from the booting state ST10 to an external power connecting state ST12 (transition T2). During the external power connecting state ST12, the electronic controller 42 prohibits both the electric power discharge from the electric power storage PS ("LIC discharge=OFF") and the electric power discharge from the external I/F ("PLC discharge=OFF"). Then, the electronic controller 42 periodically monitors the connection of the external electric power to the external I/F. If the electronic controller 42 detects the disconnection of the external electric power, then the electronic controller 42 ends the operation state control (transition T4).

On the other hand, if the electronic controller 42 determines that the voltage level at the external I/F is less than 3V ("NO" in step S10), then the electronic controller 42 further determines whether the store state of the electric power storage PS is in an abnormal state (step S12). In particular, the electronic controller 42 determines whether the output voltage of the electric power storage PS is equal to or more than a predetermined upper threshold value and whether the output voltage of the electric power storage PS is less than a predetermined lower threshold value. In the illustrated embodiment, the predetermined upper threshold value is 7.8V and the predetermined lower threshold value is 4.6V, for example. However, the predetermined upper threshold value and the predetermined lower threshold value are not limited to this, and can be different as needed and/or desired. For example, the predetermined upper threshold value can be a value between 6.8-8.8V, and the predetermined lower threshold value can be a value between 3.6-5.6V.

If the electronic controller 42 determines that the output voltage of the electric power storage PS is equal to or more than 7.8V (i.e., an overcharge state of the electric power storage PS) or that the output voltage of the electric power storage PS is less than 4.6V ("YES" in step S12), then the electronic controller 42 controls the operation state from the booting state ST10 to a power-off operation state ST14 (transition T6). During the power-off operation state ST14, the electronic controller 42 performs a shut-down process to shut down the electrical device ED.

Specifically, during the power-off operation state ST14, the electronic controller 42 updates an error log stored in the data storage device 48. Basically, the electronic circuit board ECB is designed to prevent the electronic controller 42 from booting without an external power supply when the output voltage of the electric power storage PS is less than 4.6V. However, if the electronic controller 42 happens to boot up (start) due to a circuit error, then the electronic controller 42 ends the operation state control after updating the error log (transition T8). Similarly, the electronic circuit board ECB is designed to prevent the overcharge state of the electric power storage PS. However, if the overcharge state of the electric power storage PS occurs, then the electronic controller 42 also ends the operation state control after updating the error log (transition T8).

Furthermore, during the power-off operation state ST14, the electronic controller 42 first allows the electric power discharge from the electric power storage PS ("LIC discharge=ON") and prohibits the electric power discharge from the external I/F ("PLC discharge=OFF"), after which the electronic controller 42 prohibits the electric power discharge from the electric power storage PS ("LIC discharge=OFF") and resetting itself to prevent the electronic controller 42 from becoming unable to perform any actions. When the shut-down process is completed, then the electronic controller 42 ends the operation state control (transition T8).

On the other hand, if the electronic controller 42 determines that the output voltage of the electric power storage PS is equal to or more than 4.6V and less than 7.8V ("NO" in step S12), then the electronic controller 42 controls the operation state from the booting process ST10 to a shift operation state ST15 (transition T9). During the shift operation state ST15, the electronic controller 42 can control the rear derailleur RD in either manual control mode or in automatic control mode, and perform the gear shift control of the rear derailleur RD.

During the shift operation state ST15, the electronic controller 42 first allows both the electric power discharge from the external I/F ("PLC discharge=ON") and the electric power discharge from the electric power storage PS ("LIC discharge=ON"), and then operates in a normal operation state ST16.

During the normal operation state ST16, the electronic controller 42 can control the rear derailleur RD in either manual control mode or in automatic control mode, and perform the gear shift control of the rear derailleur RD. The operation in the normal operation state ST16 will be described later in detail.

During the normal operation state ST16, the electronic controller 42 periodically monitors whether the store state of the electric power storage PS is in an abnormal state. In particular, the electronic controller 42 monitors whether the output voltage of the electric power storage PS is equal to or more than a predetermined electric power value. In the illustrated embodiment, the predetermined electric power value is 7.8V, for example. However, the predetermined electric power value is not limited to this value, and can be different as needed and/or desired. For example, the predetermined electric power value can be a value between 6.8-8.8V. The electronic controller 42 further monitors whether the output voltage of the electric power storage PS is equal to or less than a second predetermined electric power value. In the illustrated embodiment, the second predetermined electric power value is 4.6V, for example. However, the second predetermined electric power value is not limited to this value, and can be different as needed and/or desired. For example, the second predetermined electric power value can be a value between 3.6-5.6V. The electronic controller 42 further monitors whether overcurrent exists in the electronic circuit board ECB. If the electronic controller 42 determines that the output voltage of the electric power storage PS is equal to or more than 7.8V, that the output voltage of the electric power storage PS is equal to or less than 4.6V, or that overcurrent exists in the electronic circuit board ECB, then the electronic controller 42 control the operation state from the normal operation state ST16 to the power-off operation state ST14 (transition T10). Thus, in the illustrated embodiment, the store state includes a second store state in that the output voltage of the electric power storage PS (e.g., the electric power value) becomes equal to or smaller than (or falling below) 4.6V (e.g., the second predetermined electric power value). The operation state further includes the power-off operation state ST14 (e.g., the second power-off operation state). The electronic controller 42 is configured to control the operation state from the normal operation state ST16 to the power-off operation state ST14 in accordance with the information relating to the second store state.

During the normal operation state ST16, the electronic controller 42 also monitors whether pulses (i.e., vehicle speed pulses) corresponding to the frequency of the alternate current from the electric power generator 26 are outputted from the output state detection sensor 52. If the electronic controller 42 detects the vehicle speed pulses, then the electronic controller 42 further determines whether the rotational speed of the rear wheel RW is equal to or less than a first predetermined speed value (step S14). In the illustrated embodiment, the first predetermined speed value is 49 rpm, for example. However, the first predetermined speed value is not limited to this value, and can be different as needed and/or desired. For example, the first predetermined speed value can be a value between 36-60 rpm.

If the electronic controller 42 determines that the rotational speed of the rear wheel RW is more than 49 rpm ("NO" in step S14), then the electronic controller 42 returns to the normal operation state ST16 and continues to monitor the vehicle speed pulses.

On the other hand, if the electronic controller 42 determines that the rotational speed of the rear wheel RW is equal to or less than 49 rpm ("YES" in step S14), then the electronic controller 42 controls the operation state from the normal operation state ST16 to a power-saving operation state ST18 (transition T12). Thus, in the illustrated embodiment, the operation state includes the normal operation state ST16 and the power-saving operation state (e.g., the electric power-saving operation state) ST18. The electronic controller 42 is configured to control the operation state from the normal operation state ST16 to the power-saving operation state ST18 (transition T12) in accordance with information relating to the output state of the electric power generator 26. Furthermore, in the illustrated embodiment, the output state includes a first output state in that the rotational speed of the rear wheel RW (e.g., the speed value relating to the forward speed) of the bicycle V becomes equal to or smaller than (or falling below) 49 rpm (e.g., the first predetermined speed value). The electronic controller 42 is configured to control the operation state from the normal operation state ST16 to the power-saving operation state ST18 (transition T12) in accordance with the information relating to the first output state. The operation in the power-saving operation state ST18 will be described later in detail. Here, in the illustrated embodiment, the electronic controller 42 can further determine whether the rear derailleur RD is allowed to operate or allows an operation in the power-saving operation state ST18. In this case, while the rear derailleur RD is not allowed to operate or does not allow the operation in the power-saving operation state ST18, the electronic controller 42 does not control the operation state from the normal operation state ST16 to the power-saving operation state ST18 (transition T12) even if the electronic controller 42 determines that the rotational speed of the rear wheel RW is equal to or less than 49 rpm ("YES" in step S14). In the illustrated embodiment, the electronic controller 42 determines whether the rear derailleur RD is allowed to operate or allows an operation in the power-saving operation state ST18 by reading a status flag that has been changed by a notification from the rear derailleur RD, for example.

During the normal operation state ST16, the electronic controller 42 also monitors whether the output voltage of the electric power storage PS is equal to or less than a first predetermined electric power value. In other words, the electronic controller 42 monitors whether a low voltage state of the electric power storage PS (i.e., "LIC low voltage") occurs. In the illustrated embodiment, the first predetermined electric power value is 6V, for example. However, the first predetermined electric power value is not limited to this, and can be different as needed and/or desired. For example, the first predetermined electric power value can be 5-7V. In particular, the first electric power value can be set to an electric power value that is not determined as an abnormal state of the store state of the electric power storage PS. For example, the first electric power value can be set to an electric power value between 4.6V and 7.8V, which are used for determining transitions T6 and T10. If the electronic controller 42 determines that the output voltage of the electric power storage PS is equal to or less than 6V, then the electronic controller 42 controls the operation state from the normal operation state ST16 to the power-saving operation state ST18 (transition T14). Thus, in the illustrated embodiment, the store state includes a first store state in that the output voltage of the electric power storage PS (e.g., the electric power value of the electric power storage device) becomes equal to or smaller than (or falling below) 6V (e.g., the first predetermined electric power value). The electronic controller 42 is configured to control the operation state from the normal operation state ST16 to the power-saving operation state ST18 in accordance with the information relating to the first store state. Thus, in the illustrated embodiment, the second predetermined electric power value (4.6V) is smaller than the first predetermined electric power value (6V). In the illustrated embodiment, when the electronic controller 42 determines the low voltage state of the electric power storage PS (i.e., "LIC low voltage"), then the electronic controller 42 immediately controls the operation state from the normal operation state ST16 to the power-saving operation state ST18 (transition T14). However, the electronic controller 42 can be configured such that the electronic controller 42 controls the operation state from the normal operation state ST16 to the power-saving operation state ST18 (transition T14) when the electronic controller 42 determines the low voltage state of the electric power storage PS (i.e., "LIC low voltage") continuously for more than two seconds. In this case, the electronic controller 42 can also be configured such that the electronic controller 42 immediately controls the operation state from the normal operation state ST16 to the power-saving operation state ST18 (transition T14) when the electronic controller 42 determines the low voltage state of the electric power storage PS (i.e., "LIC low voltage") while the rear derailleur RD is not shifting.

During the normal operation state ST16, the electronic controller 42 also periodically monitors whether the voltage level at the external I/F (i.e., "PLC voltage") is larger than the output voltage of the electric power storage PS. If the electronic controller 42 determines that the voltage level at the external I/F is larger than the output voltage of the electric power storage PS, then the electronic controller 42 controls the operation state from the normal operation state ST16 to the external power connecting state ST12 (transition T16). In the illustrated embodiment, to prevent a false detection, the electronic controller 42 can compare the voltage level at the external I/F with a voltage value in which a predetermined offset voltage, such as 0.2V, is added to the output voltage of the electric power storage PS.

During the normal operation state ST16, the electronic controller 42 also monitors whether a power-off command is received from other master controllers or components. If the electronic controller 42 determines that the power-off command is received from other masters or components, then the electronic controller 42 controls the operation state from the normal operation state ST16 to the external power connecting state ST12 (transition T18). Furthermore, in the illustrated embodiment, when the electronic circuit board ECB includes a wireless communicator to communicate with wireless communicators of other electric components of the bicycle V, the electronic controller 42 can be configured to prevent wireless communication while the rotational speed of the rear wheel RW is less than a predetermined speed value, such as 36 rpm, which corresponds to the forward speed of 5 km/h, for example.

When the electronic controller 42 control the operation state from the normal operation state ST16 to the power-saving operation state ST18 (transitions T12 or T14), the electronic controller 42 monitors whether a wake-up command is received. If the electronic controller 42 determines that the wake-up command is received, then the electronic controller 42 controls the operation state from the power-saving operation state ST18 to the normal operation state ST16 (transitions T20).

During the power-saving operation state ST18, the electronic controller 42 monitors whether the rotation of the rear sprockets CS is detected by the rotation detection sensor 25. In the illustrated embodiment, the rotation detection sensor 25 can output pulses (i.e., "CS pulses") in response to detecting the detected part 24. In this case, the electronic controller 42 can monitor whether the rotation of the rear sprockets CS is detected by the rotation detection sensor 25 by monitoring whether the CS pulses are received from the rotation detection sensor 25.

If the electronic controller 42 determines that the CS pulses are not received for a predetermined time period, such as 60 seconds, then the electronic controller 42 further determines whether the rotational speed of the rear wheel RW is equal to or less than a second predetermined speed value (step S16). In the illustrated embodiment, the second predetermined speed value is 36 rpm, for example. However, the second predetermined speed value is not limited to this value, and can be different as needed and/or desired. For example, the second predetermined speed value can be a value between 30-40 rpm. If the electronic controller 42 determines that the rotational speed of the rear wheel RW is more than 36 rpm ("NO" in step S16), then the electronic controller 42 returns to the power-saving operation state ST18 and continues to monitor the CS pulses. On the other hand, if the electronic controller 42 determines that the rotational speed of the rear wheel RW is equal to or less than 36 rpm ("YES" in step S16), then the electronic controller 42 controls the operation state from the power-saving operation state ST18 to the power-off operation state ST14 (transition T22). Thus, in the illustrated embodiment, the output state includes a second output state in that the rotational speed of the rear wheel RW (e.g., the speed value) becomes equal to or smaller than (or falling below) 36 rpm (e.g., the second predetermined speed value). The second predetermined speed value (36 rpm) is smaller than the first predetermined speed value (49 rpm). The operation state further includes the power-off operation state ST14 (e.g., the first power-off operation state). The electronic controller 42 is configured to control the operation state from the power-saving operation state ST18 to the power-off operation state ST14 (e.g., the first power-off operation state) in accordance with the information relating to the second output state.

On the other hand, if the electronic controller 42 determines that the CS pulses are received, then the electronic controller 42 controls the operation state from the power-saving operation state ST18 to a wake-up determination state ST20 (transition T24). In other words, in the illustrated embodiment, the electronic controller 42 utilizes the reception of the CS pulses as a wake-up condition from the power-saving operation state ST18. However, the wake-up condition is not limited to this. The electronic controller 42 can detect, as the wake-up condition, a reverse timing of the rear sprocket CS (e.g., a timing when a forward rotation changes to a reverse rotation), a rotation interruption of the rear sprocket CS, a deassertion of a signal indicative of the LIC low voltage (e.g., a timing when the electronic controller 42 does not determine the low voltage state of the electric power storage PS), or over current at the external I/F (i.e., over current at PLC line). Furthermore, in the illustrated embodiment, these wake-up conditions can be utilized as a wake-up condition for wake-up from other sleep states of the electronic controller 42.

During the wake-up determination state ST20, the electronic controller 42 monitors whether the rotational speed of the rear wheel RW is more than a third predetermined speed value. In the illustrated embodiment, the third predetermined speed value is 36 rpm, for example. However, the third predetermined speed value is not limited to this value, and can be different as needed and/or desired. For example, the third predetermined speed value can be a value between 30-40 rpm. The electronic controller 42 also monitors whether the output voltage of the electric power storage PS is equal to or more than a predetermined threshold. In the illustrated embodiment, this predetermined threshold is 6V and is the same as the first predetermined electric power value (see transition T14), for example. However, the predetermined threshold is not limited to this, and is different from 6V as needed and/or desired. For example, the predetermined threshold can be a value between 5-7V.

If the electronic controller 42 determines that the rotational speed of the rear wheel RW is equal to or less than 36 rpm or that the output voltage of the electric power storage PS is less than 6V, then the electronic controller 42 controls the operation state from the wake-up determination state ST20 to the power-saving operation state ST18 (transition T26).

On the other hand, if the electronic controller 42 determines that the rotational speed of the rear wheel RW is more than 36 rpm and that the output voltage of the electric power storage PS is equal to or more than 6V, then the electronic controller 42 controls the operation state from the wake-up determination state ST20 to the normal operation state ST16 (transition T28). Thus, in the illustrated embodiment, the output state includes a third output state in that the rotational speed of the rear wheel RW (e.g., the speed value) becomes larger than (or exceeds) 36 rpm (e.g., the third predetermined speed value). The electronic controller 42 is configured to control the operation state from the power-saving operation state ST18 to the normal operation state ST16 (via the wake-up determination state ST20) in accordance with the information relating to the third output state. Furthermore, in the illustrated embodiment, the store state includes a third store state in that the output voltage (e.g., the electric power value) of the electric power storage PS becomes equal to or larger than 6V (e.g., the first predetermined electric power value). The electronic controller 42 is configured to control the operation state from the power-saving operation state ST18 to the normal operation state ST16 (via the wake-up determination state ST20) in accordance with the information relating to the third store state.

With the operation state control according to the illustrated embodiment, the electronic controller 42 differently operates according to the operation states (ST10, ST12, ST14, ST16, ST18 and ST20) as seen in the following table.

| Operation State | Clock Rate | Speed Determination (Input Capture) | Periodic Processing (1 ms) | Event Processing | IDLE Processing |
|---|---|---|---|---|---|
| Booting State | Internal Oscillator (20 MHz) | OFF | OFF | OFF | OFF |
| Normal Operation State | External Oscillator (32 MHz) | ON (Timer Clock: 128 KHz) | ON | ON | ON |
| Power-saving Operation State | Stop Clock | ON (Timer Clock: 16 KHz) | OFF | OFF | OFF |
| Wake-up Determination State | Internal Oscillator (20 MHz) | ON (Timer Clock: 16 KHz) | OFF | OFF | OFF |
| External Power Connecting State | External Oscillator (32 MHz) | ON (Timer Clock: 128 KHz) | ON | ON | ON |
| Power-off Operation State | External Oscillator (32 MHz) | OFF | OFF | ON | ON |

In particular, as shown in the table above, the function and/or the performance (e.g., clock rage) of the electronic controller 42 is limited in the power-saving operation state ST18 and the wake-up determination state ST20 with respect to the normal operation state ST16. Specifically, in the illustrated embodiment, the electronic controller 42 is configured to limit functionality of the rear derailleur RD (e.g., the component) in the power-saving operation state ST18 and the wake-up determination state ST20 by limiting the function and/or the performance of the electronic controller 42. Specifically, in the illustrated embodiment, the electronic controller 42 is configured to decrease the operating rate of the rear derailleur RD in the power-saving operation state ST18 and the wake-up determination state ST20 with respect to the normal operation state ST16 by decreasing the clock rate and the input capture rate and by turning off the 1 ms periodic processing, for example. In particular, with this operation state control, the electronic controller 42 is configured to decrease the response of the shifting operation (e.g., the operating rate) of the rear derailleur RD in the power-saving operation state ST18 and the wake-up determination state ST20 with respect to the normal operation state ST16. Thus, with this operation state control, the current consumption of the electronic circuit board ECB and the rear derailleur RD can be suppressed while the electronic controller 42 is operating the rear derailleur RD in the power-saving operation state ST18 or the wake-up determination state ST20. Thus, even if the charging current generated by the electric power generator 26 becomes lower, the operable time period can be ensured.

In the illustrated embodiment, as seen in FIG. 5, the electronic circuit board ECB further includes a rectifier 56. Thus, in the illustrated embodiment, the electrical device ED further comprises the rectifier 56. In the illustrated embodiment, the rectifier 56 is electrically connected between the electric power generator 26 and the electric power storage PS. The rectifier 56 is configured to rectify the electrical power outputted from the electric power generator 26. In particular, the rectifier 56 is an electrical device or circuit that converts alternating current from the electric power generator 26 to direct current to supply the direct current to the electric power storage PS and the electrical components of the bicycle V.

Figure 11:
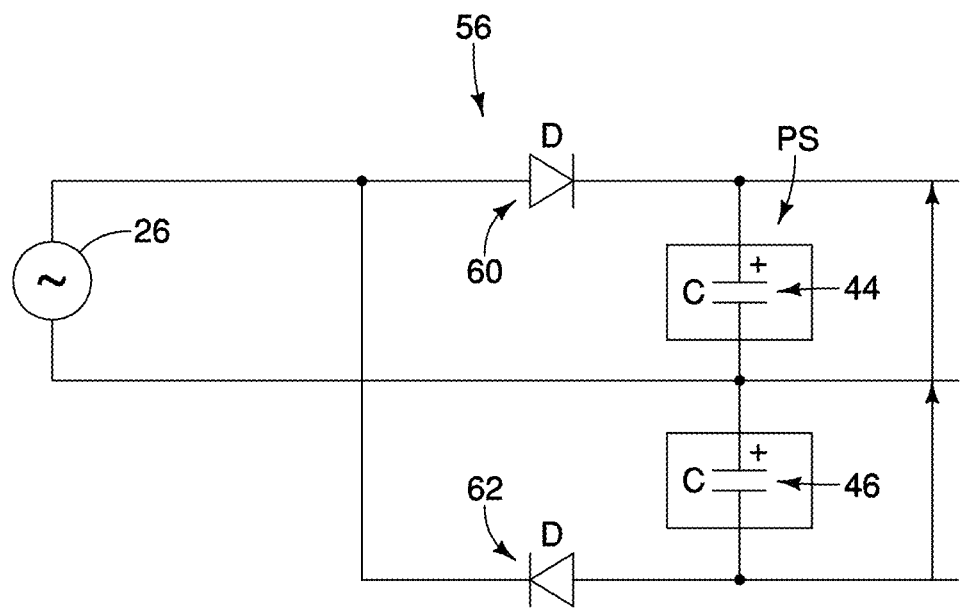
FIG. 11 is a circuit diagram illustrating an electrical connection of the electric power generator and the electric power storage via a rectifier.

FIG. 11 illustrates a circuit diagram illustrating an electrical connection of the electric power generator and the electric power storage PS via the rectifier 56. In the illustrated embodiment, as seen in FIG. 11, the electric power storage PS includes the first and second capacitors 44 and 46 (e.g., the plurality of electric power storage elements) connected in series relative to each other. The rectifier 56 includes a first diode 60 and a second diode 62. The first and second diodes 60 and 62 are connected between the electric power generator 26 and the first and second capacitors 44 and 46 such that one of the first and second diodes 60 and 62 is conducting in each half cycle. Specifically, when the output voltage of the electric power generator 26 is positive, the first capacitor 44 charges up through the first diode 60, and when the output voltage of the electric power generator 26 is negative, the second capacitor 46 charges up through the second diode 62. Thus, in the illustrated embodiment, the first and second capacitors 44 and 46 (e.g., the plurality of electric power storage elements) are configured to store the electrical power outputted from the electric power generator 26 in a time-division manner.

Furthermore, as seen in FIG. 11, the first and second capacitors 44 and 46 can charge up to the same output voltage of the electric power generator 26, respectively. Thus, the total output voltage of twice the output voltage of the electric power generator 26 can be taken across the two series connected capacitors 44 and 46. Thus, in the illustrated embodiment, the first and second capacitors 44 and 46 of the rectifier 56 and the first and second capacitors 44 and 46 (e.g., the electric power storage elements) are configured to form a voltage multiplier circuit. In the illustrated embodiment, as seen in FIG. 11, the rectifier 56 and the electric power storage PS forms a voltage multiplier circuit which has a voltage multiplication factor of two. However, the rectifier 56 and the electric power storage PS can be differently configured to form a voltage multiplier circuit which has a voltage multiplication factor that is more than two. With this configuration, the first and second capacitors 44 and 46 of the electric power storage PS can be charged while securing an amount of charging current even if the electric power generator 26 only generates a low output voltage.

Figure 12:
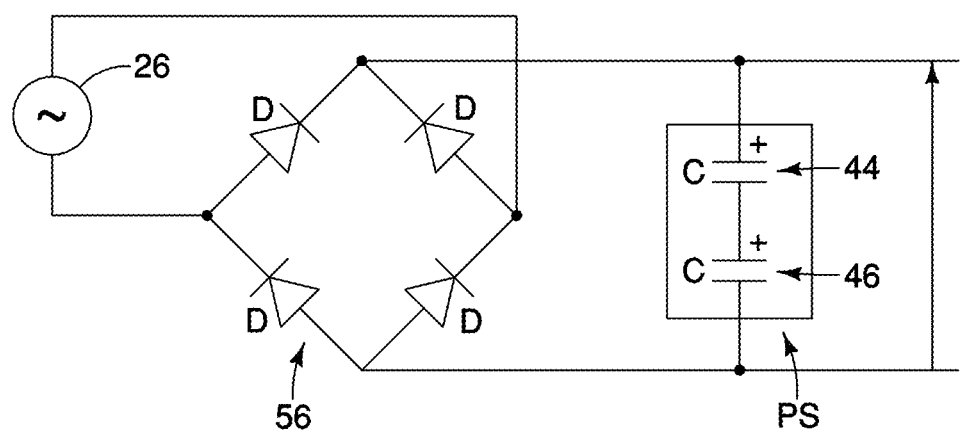
FIG. 12 is a circuit diagram illustrating another electrical connection of the electric power generator and the electric power storage via another rectifier.

In the illustrated embodiment, as seen in FIG. 11, the rectifier 56 is configured to form the voltage multiplier circuit. However, the rectifier 56 is not limited to this. For example, as shown in FIG. 12, the rectifier 56 can be formed as a full-bridge rectifier circuit that simultaneously charging the first and second capacitors 44 and 46 of the electric power storage PS, as needed and/or desired.

In the illustrated embodiment, an example is illustrated in which the electronic controller 42 controls the operation state of the rear derailleur RD. However, the electronic controller 42 can similarly control operation state of any other electric components of the bicycle V. For example, these electric components include the height adjustable seatpost ASP, the rear shock absorbers RS, the front fork FF, the electric drive unit DU, and the like. In this case, the controller is configured to decrease an operating rate of the electric component in the power-saving operation state ST and the wake-up determination state ST20 with respect to the normal operation state ST16 by decreasing the clock rate and the input capture rate and by turning off the 1 ms periodic processing, for example. In particular, in the case of the height adjustable seatpost ASP, the rear shock absorbers RS and the front fork FF, the electronic controller 42 is configured to decrease the response (e.g., the operating rate) of the height adjustment control of the height adjustable seatpost ASP and the response (e.g., the operating rate) of the stiffness and/or stoke length control of the rear shock absorber RS and the front fork FF, for example. Also, in the case of the electric drive unit DU, the electronic controller 42 is configured to decrease the generating force rate to assist pedaling (e.g., the operating rate) of the electric drive unit DU, for example. Thus, in the illustrated embodiment, the operating rate includes at least one of generating force rate to assist pedaling. Furthermore, when the electronic circuit board ECB includes a wireless communicator to communicate with wireless communicators of other electric components of the bicycle V, the electronic controller 42 can be configured to decrease a wireless communication rate (e.g., an operating rate) of the wireless communicators in the power-saving operation state ST and the wake-up determination state ST20 with respect to the normal operation state ST16.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a human-powered vehicle (e.g., bicycle) in an upright, riding position and equipped with the electrical device. Accordingly, these directional terms, as utilized to describe the electrical device should be interpreted relative to a human-powered vehicle (e.g., bicycle) in an upright riding position on a horizontal surface and that is equipped with the control device. The terms "left" and "right" are used to indicate the "right" when referencing from the right side as viewed from the rear of the human-powered vehicle (e.g., bicycle), and the "left" when referencing from the left side as viewed from the rear of the human-powered vehicle (e.g., bicycle).

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three. Also, the term "and/or" as used in this disclosure means "either one or both of".

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A control device for a human-powered vehicle, the human-powered vehicle including a generator configured to output electrical power, an electric power storage device electrically connected to the generator, and a component having an actuator actuated by electrical power from at least one of the generator and the electric power storage device, the control device comprising:

a controller electrically connected to at least one of the generator and the electric power storage device, the controller being configured to control an operation state of the component in accordance with information relating to at least one of an output state of the generator and a store state of the electric power storage device, the operation state including a normal operation state, an electric power-saving operation state having an electric power consumption less than that of the normal operation state and an electric power-off operation state having an electric power consumption less than that of the electric power-saving operation state, and the controller being configured to control the operation state from the normal operation state to the electric power-saving operation state or the electric power-off operation state in accordance with the information.

2. The control device according to claim 1, wherein the output state includes a first output state in that a speed value relating to a forward speed of the human-powered vehicle becomes equal to or smaller than a first predetermined speed value, and the controller is configured to control the operation state from the normal operation state to the electric power-saving operation state in accordance with the information relating to the first output state.

3. The control device according to claim 2, wherein the output state includes a second output state in that the speed value becomes equal to or smaller than a second predetermined speed value, the second predetermined speed value is smaller than the first predetermined speed value, the electric power-off operation state further includes a first power-off operation state, and the controller is configured to control the operation state from the electric power-saving operation state to the first power-off operation state in accordance with the information relating to the second output state.

4. The control device according to claim 2, wherein the output state includes a third output state in that the speed value becomes larger than a third predetermined speed value, and the controller is configured to control the operation state from the electric power-saving operation state to the normal operation state in accordance with the information relating to the third output state.

5. The control device according to claim 1, wherein the store state includes a first store state in that an electric power value of the electric power storage device becomes equal to or smaller than a first predetermined electric power value, and the controller is configured to control the operation state from the normal operation state to the electric power-saving operation state in accordance with the information relating to the first store state.

6. The control device according to claim 5, wherein the store state includes a second store state in that the electric power value become equal to or smaller than a second predetermined electric power value, the second predetermined electric power value is smaller than the first predetermined electric power value, the electric power-off operation state further includes a second power-off operation state, and the controller is configured to control the operation state from the normal operation state to the second power-off operation state in accordance with the information relating to the second store state.

7. The control device according to claim 5, wherein
the store state includes a third store state in that the electric power value of the electric power storage device becomes equal to or larger than the first predetermined electric power value, and
the controller is configured to control the operation state from the electric power-saving operation state to the normal operation state in accordance with the information relating to the third store state.

8. The control device according to claim 1, wherein
the controller is configured to limit functionality of the component in the electric power-saving operation state.

9. The control device according to claim 8, wherein
the controller is configured to decrease an operating rate of the component in the electric power-saving operation state, and
the operating rate includes at least one of generating force rate to assist pedaling.

10. An electrical device comprising:
the control device according to claim 1; and
the component having the actuator activated in response to operation of an operating member.

11. The electrical device according to claim 10, further comprising
a rectifier electrically connected between the generator and the electric power storage device, the rectifier is configured to rectify the electrical power outputted from the generator.

12. The electrical device according to claim 11, wherein
the electric power storage device includes a plurality of electric power storage elements connected in series relative to each other, the plurality of electric power storage elements is configured to store the electrical power outputted from the generator in a time-division manner.

13. The electrical device according to claim 12, wherein
the rectifier and the electric power storage elements are configured to form a voltage multiplier circuit.

14. The electrical device according to claim 10, further comprising a hub axle; and
a hub body rotatably provided with respect to the hub axle,
the generator being disposed being between the hub axle and the hub body.

15. The electrical device according to claim 14, wherein
the electric power storage device is provided to the hub axle.

16. The electrical device according to claim 15, wherein
the electric power storage device is accommodated inside the hub body.

17. The electrical device according to claim 14, wherein
the controller is provided to the hub body.

18. A system for a human-powered vehicle, the system comprising:
the electrical device according to claim 10.

19. A control device for a human-powered vehicle, the human-powered vehicle including a generator configured to output electrical power, an electric power storage device electrically connected to the generator, and a component having an actuator actuated by electrical power from at least one of the generator and the electric power storage device, the control device comprising:
a controller electrically connected to at least one of the generator and the electric power storage device, the controller being configured to control an operation state of the component in accordance with information relating to at least one of an output state of the generator and a store state of the electric power storage device,
the operation state including a normal operation state and an electric power-saving operation state,
the output state including a first output state in that a speed value relating to a forward speed of the human-powered vehicle becomes equal to or smaller than a first predetermined speed value that is larger than zero, and
the controller being configured to control the operation state from the normal operation state to the electric power-saving operation state in accordance with the information relating to the first output state.

* * * * *